US009976732B2

(12) United States Patent
Myers et al.

(10) Patent No.: US 9,976,732 B2
(45) Date of Patent: *May 22, 2018

(54) FLAT PANEL LIGHTING DEVICE AND DRIVING CIRCUITRY

(71) Applicant: UNITY OPTO TECHNOLOGY CO., LTD., New Taipei (TW)

(72) Inventors: J. Richard Myers, Pasadena, CA (US); John Araki, Tustin, CA (US)

(73) Assignee: Unity Opto Technology Co., LTD. (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/381,974

(22) Filed: Dec. 16, 2016

(65) Prior Publication Data
US 2017/0097147 A1 Apr. 6, 2017

Related U.S. Application Data

(63) Continuation of application No. 15/241,744, filed on Aug. 19, 2016, now Pat. No. 9,523,487, which is a
(Continued)

(51) Int. Cl.
*G02F 1/1333* (2006.01)
*F21V 23/02* (2006.01)
(Continued)

(52) U.S. Cl.
CPC ............... *F21V 23/02* (2013.01); *F21S 8/04* (2013.01); *F21V 23/003* (2013.01); *F21V 23/06* (2013.01);
(Continued)

(58) Field of Classification Search
CPC .... G02B 6/0083; G02B 6/009; G02B 6/0093; G02F 1/133615; G02F 1/133608; G02F 1/133603; G02F 1/13306; F21Y 2103/003
(Continued)

(56) References Cited

U.S. PATENT DOCUMENTS 3,892,959 A 7/1975 Pulles
4,975,809 A 12/1990 Ku
(Continued)

FOREIGN PATENT DOCUMENTS

CN 201225561 4/2009
CN 201513783 6/2010
(Continued)

OTHER PUBLICATIONS

Notice of Allowance issued in U.S. Appl. No. 14/700,671 dated Dec. 6, 2016, 33 pages.
(Continued)

*Primary Examiner* — Elmito Breval
*Assistant Examiner* — Meghan Ulanday
(74) *Attorney, Agent, or Firm* — Eric L. Sophir; Dentons US LLP

(57) ABSTRACT

The light fixture includes a frame configured to define a channel, and a substantially flat light emitting diode (LED) panel disposed within the frame. Power circuitry is disposed within the first channel, the power circuitry being configured to electrically couple the substantially flat LED panel to an external AC power supply. The power circuitry is sized to be positioned within the first channel and has a length and a width, the length-to-width ratio being at least 5 to 1, and optionally at least 10 to 1. The power circuitry is configured to convert an AC input into a DC output suitable for powering the substantially flat light emitting diode (LED) panel. The substantially flat light emitting diode (LED) panel includes an optically transmissive panel, and an array of LEDs disposed adjacent to an edge of the optically transmissive panel and disposed adjacent at least one edge of the frame.

20 Claims, 24 Drawing Sheets

Related U.S. Application Data continuation of application No. 14/497,943, filed on Sep. 26, 2014, now Pat. No. 9,423,113, and a continuation of application No. 13/473,929, filed on May 17, 2012, now abandoned.

(60) Provisional application No. 61/487,253, filed on May 17, 2011, provisional application No. 61/579,472, filed on Dec. 22, 2011.

(51) Int. Cl.

| | | |
|---|---|---|
| *F21S 8/04* | (2006.01) | |
| *F21V 8/00* | (2006.01) | |
| *F21V 23/06* | (2006.01) | |
| *F21V 29/89* | (2015.01) | |
| *F21V 23/00* | (2015.01) | |
| *F21Y 105/10* | (2016.01) | |
| *F21Y 115/10* | (2016.01) | |
| *H05B 37/02* | (2006.01) | |
| *H05B 33/08* | (2006.01) | |

(52) U.S. Cl.
CPC ............ *F21V 29/89* (2015.01); *G02B 6/0051* (2013.01); *G02B 6/0055* (2013.01); *G02B 6/0088* (2013.01); *G02B 6/0091* (2013.01); *F21Y 2105/10* (2016.08); *F21Y 2115/10* (2016.08); *H05B 33/0854* (2013.01); *H05B 33/0872* (2013.01); *H05B 37/0218* (2013.01); *H05B 37/0227* (2013.01)

(58) Field of Classification Search
USPC ............................ 362/612, 632–634; 349/58
See application file for complete search history.

(56) References Cited

U.S. PATENT DOCUMENTS

| | | |
|---|---|---|
| 5,027,258 A | 6/1991 | Schoniger et al. |
| 5,276,591 A | 1/1994 | Hegarty |
| 5,375,043 A | 12/1994 | Tokunaga |
| 5,636,462 A | 6/1997 | Kleiman |
| 5,641,219 A | 6/1997 | Mizobe |
| 5,806,972 A | 9/1998 | Kaiser et al. |
| 6,042,243 A | 3/2000 | Grill et al. |
| 6,095,660 A | 8/2000 | Moriyama et al. |
| 6,231,213 B1 | 5/2001 | Schmidt et al. |
| 6,641,283 B1 | 11/2003 | Bohler |
| 6,739,734 B1 | 5/2004 | Hulgan |
| 6,758,573 B1 | 7/2004 | Thomas et al. |
| 6,840,646 B2 | 1/2005 | Cornelissen et al. |
| 6,880,963 B2 | 4/2005 | Luig et al. |
| 6,997,576 B1 | 2/2006 | Lodhie et al. |
| 7,015,987 B2 | 3/2006 | Wu et al. |
| 7,090,387 B2 | 8/2006 | Kohno |
| 7,172,324 B2 | 2/2007 | Wu et al. |
| 7,201,488 B2 | 4/2007 | Sakamoto et al. |
| 7,236,155 B2 | 6/2007 | Han et al. |
| 7,374,327 B2 | 5/2008 | Schexnaider |
| 7,445,369 B2 | 11/2008 | Yu et al. |
| 7,448,768 B2 | 11/2008 | Sloan et al. |
| 7,473,022 B2 | 1/2009 | Yoo |
| 7,547,112 B2 | 6/2009 | Kim |
| 7,563,015 B2 | 7/2009 | Tzung-Shiun |
| 7,570,313 B2 | 8/2009 | Wu et al. |
| 7,583,901 B2 | 9/2009 | Nakagawa et al. |
| 7,604,389 B2 | 10/2009 | Sakai et al. |
| 7,708,447 B2 | 5/2010 | Tobler et al. |
| 7,722,221 B2 | 5/2010 | Chae |
| 7,726,617 B2 | 6/2010 | Zambelli et al. |
| 7,766,536 B2 | 8/2010 | Peifer et al. |
| 7,787,070 B2 | 8/2010 | Choi et al. |
| 7,825,892 B2 | 11/2010 | Lin et al. |
| 7,894,013 B2 | 2/2011 | Chung et al. |
| 7,918,598 B2 | 4/2011 | Peifer et al. |
| 8,029,293 B2 | 10/2011 | Janos et al. |
| 8,061,867 B2 | 11/2011 | Kim et al. |
| D653,376 S | 1/2012 | Kong et al. |
| 8,092,034 B2 | 1/2012 | Zarian et al. |
| 8,092,069 B2 | 1/2012 | Chuang et al. |
| 8,096,671 B1 | 1/2012 | Cronk et al. |
| 8,136,958 B2 | 3/2012 | Verfuerth et al. |
| 8,167,627 B1 | 5/2012 | Janos et al. |
| 8,915,636 B2 | 12/2014 | Araki et al. |
| 9,062,867 B2 | 6/2015 | Rodgers et al. |
| 9,068,704 B2 | 6/2015 | Burton et al. |
| 9,206,964 B2 | 12/2015 | Marsh et al. |
| 9,335,036 B2 * | 5/2016 | Myers .................. F21S 8/04 |
| 9,423,113 B2 * | 8/2016 | Myers .................. F21S 8/04 |
| 9,441,801 B1 * | 9/2016 | Myers .................. F21S 8/04 |
| 2004/0240230 A1 | 12/2004 | Kitajima et al. |
| 2005/0082453 A1 | 4/2005 | Chuang |
| 2005/0174755 A1 | 8/2005 | Becker |
| 2005/0180172 A1 | 8/2005 | Jang |
| 2005/0219860 A1 | 10/2005 | Schexnaider |
| 2006/0022214 A1 | 2/2006 | Morgan et al. |
| 2006/0158906 A1 | 7/2006 | Parker |
| 2006/0291238 A1 | 12/2006 | Epstein et al. |
| 2006/0291241 A1 | 12/2006 | Wojtowicz et al. |
| 2007/0000849 A1 | 1/2007 | Lutz et al. |
| 2007/0047262 A1 | 3/2007 | Schardt et al. |
| 2007/0076431 A1 | 4/2007 | Atarashi et al. |
| 2007/0097227 A1 | 5/2007 | Toyokawa |
| 2007/0115402 A1 | 5/2007 | Zhang et al. |
| 2007/0165424 A1 | 7/2007 | Sakai |
| 2007/0171670 A1 | 7/2007 | Zagar et al. |
| 2007/0222914 A1 | 9/2007 | Kotchick et al. |
| 2007/0247414 A1 | 10/2007 | Roberts |
| 2007/0247842 A1 | 10/2007 | Zampini et al. |
| 2007/0247870 A1 | 10/2007 | Sakai et al. |
| 2008/0013303 A1 | 1/2008 | Guarino |
| 2008/0101094 A1 | 5/2008 | Spada et al. |
| 2008/0231196 A1 | 9/2008 | Weng et al. |
| 2008/0297679 A1 | 12/2008 | Jung et al. |
| 2009/0097277 A1 | 4/2009 | Iwasaki |
| 2009/0135608 A1 | 5/2009 | Sell |
| 2009/0147504 A1 | 6/2009 | Teeters |
| 2009/0147507 A1 | 6/2009 | Verfuerth et al. |
| 2009/0213589 A1 | 8/2009 | Peifer et al. |
| 2009/0316396 A1 | 12/2009 | Tsai |
| 2009/0323334 A1 | 12/2009 | Roberts et al. |
| 2010/0061108 A1 | 3/2010 | Zhang |
| 2010/0124064 A1 | 5/2010 | Ogawa et al. |
| 2010/0165241 A1 | 7/2010 | Kim et al. |
| 2010/0171145 A1 | 7/2010 | Morgan et al. |
| 2010/0172138 A1 | 7/2010 | Richardson |
| 2010/0176742 A1 | 7/2010 | Lee et al. |
| 2010/0237798 A1 | 9/2010 | Wolf et al. |
| 2010/0284185 A1 | 11/2010 | Ngai |
| 2010/0289428 A1 | 11/2010 | Frazier et al. |
| 2010/0315833 A1 | 12/2010 | Holman et al. |
| 2011/0068708 A1 | 3/2011 | Coplin et al. |
| 2011/0075414 A1 | 3/2011 | Van De Ven et al. |
| 2011/0138665 A1 | 6/2011 | Liu |
| 2011/0149596 A1 | 6/2011 | Lv et al. |
| 2011/0279063 A1 | 11/2011 | Wang et al. |
| 2011/0291569 A1 | 12/2011 | Shin et al. |
| 2012/0020109 A1 | 1/2012 | Kim et al. |
| 2012/0081889 A1 | 4/2012 | Frost et al. |
| 2012/0091919 A1 | 4/2012 | Tveit |
| 2012/0106177 A1 | 5/2012 | Blankestijn et al. |
| 2012/0182733 A1 | 7/2012 | Cho |
| 2012/0218746 A1 | 8/2012 | Winton |
| 2012/0287631 A1 | 11/2012 | Sheng |
| 2012/0320627 A1 | 12/2012 | Araki et al. |
| 2012/0328242 A1 | 12/2012 | Hesse |
| 2013/0038211 A1 | 2/2013 | Kang |
| 2013/0044512 A1 | 2/2013 | Araki et al. |
| 2013/0070455 A1 | 3/2013 | Tsui et al. |
| 2013/0258706 A1 | 10/2013 | Urtiga et al. |
| 2014/0240966 A1 | 8/2014 | Garcia et al. |

(56) References Cited

U.S. PATENT DOCUMENTS

| | | |
|---|---|---|
| 2014/0313780 A1 | 10/2014 | Myers |
| 2014/0376266 A1 | 12/2014 | Myers |
| 2015/0049512 A1 | 2/2015 | Myers et al. |

FOREIGN PATENT DOCUMENTS

| | | |
|---|---|---|
| CN | 201628158 | 11/2010 |
| CN | 201724032 | 1/2011 |
| DE | 202009007334 | 9/2009 |
| DE | 102010006465 | 8/2011 |
| DE | 102010008359 | 8/2011 |
| DE | 202012103430 | 9/2012 |
| EP | 1059484 | 12/2000 |
| EP | 1906081 | 4/2008 |
| EP | 2088835 | 8/2009 |
| EP | 2131100 | 12/2009 |
| EP | 1361391 | 4/2010 |
| EP | 2270387 | 9/2011 |
| EP | 2495490 | 9/2012 |
| JP | 2004-271734 | 9/2004 |
| JP | 2004-335426 | 11/2004 |
| JP | 2006-106212 | 4/2006 |
| JP | 3140783 | 4/2008 |
| JP | 2011-138731 | 7/2011 |
| WO | 2009/017117 | 2/2009 |
| WO | 2009/102563 | 8/2009 |
| WO | 2010/133535 | 11/2010 |
| WO | 2012/113005 | 8/2012 |
| WO | 2012/125605 | 9/2012 |
| WO | 2012/158894 | 11/2012 |
| WO | 2012/158908 | 11/2012 |

OTHER PUBLICATIONS

Japan Patent Office Examination Action dated Dec. 13, 2016 for JP Application No. 2014-511528, "Flat Panel Lighting Device and Driving Circuitry", 2 pages.
English translation of Japan Patent Office Examination Action dated Dec. 13, 2016 for JP Application No. 2014-511528, "Flat Panel Lighting Device and Driving Circuitry", 1 page.
Notice of Allowance issued in U.S. Appl. No. 15/209,142 dated Jan. 27, 2017, 53 pages.
International Preliminary Report on Patentability dated Oct. 20, 2015 corresponding to International Patent Application No. PCT/US2014/033352, 11 pages.
International Preliminary Report on Patentability dated Oct. 20, 2015 corresponding to International Patent Application No. PCT/US2014/033953, 8 pages.
Communication and Annex from the Examining Division dated Sep. 17, 2015 corresponding to European Patent Application No. 12 726 949.6, 5 pages.
ATG Electronics Corp., "iBright Flat LED Panel", website description, undated; downloaded from http://www.atgelectronics.com/lighting/Illumination/LEDTroffer/Flat-LED-Panel.html on Apr. 25, 2013; 9 pages.
Delta Electronics, "General Lighting: LED Lighting Solutions", product brochure, undated; downloaded from http://www.delta.com.tw/product/rd/led/products/luminaire/lum_f101.asp on Mar. 30, 2012; 2 pages.
Dongbu Lightec, LED Light Panel Installation Guide, undated; downloaded from http://www.dongbulightec.ca/English/Products/LED_L_P_Tech.html on Mar. 30, 2012; 5 pages.
Dongbu Lightec, "LumiSheet Lamp", pamphlet from LIGHTFAIR International (LFI) on Apr. 23-25, 2013; 9 pages.
ELumination, "Custom LED Light Panels", undated; downloaded from www.elumanation.com on Dec. 4, 2012; 1 page.
Energetic Lighting, "LED Panel Light", product features for ELEP2x250 and ELEP2x450, undated; downloaded from www.energeticlighting.com on Mar. 30, 2012; 1 page.
Enlight Corporation, "Ultraslim LED Panel Light", website description, undated; downloaded from http://twe.enlightcorp.com on Apr. 25, 2013; 2 pages.
Foshan Sunbay Opto Electronics Co., Ltd., "Super Thin and Driver Inside 300*300 22W LED Panel Light", undated; originally downloaded from http://sunbayled.en.made-in-china.com/product/vBxnWSXobmhY/China-Super-Thin-and-Driver-Inside-300-300-22W-LED-Panel-Light.html on Apr. 20, 2013; 3 pages.
GE Lighting Solutions, "GE Lighting Flat LED Panel", undated; downloaded on Jan. 16, 2012; 10 pages.
GE Lighting Solutions, "Lumination LED Luminaires-Troffer", undated; downloaded from http://www.gelightingsolutions.com/Indoor/id-456789e/Lumination_LED_Luminaires_-_Troffer on Jul. 12, 2012; 2 pages.
GE Lighting Solutions, specification sheet for the 2×2 Edgelighting Fixture for troffer fixtures, pamphlet from LIGHTFAIR International (LFI) on May 17-19, 2011; 1 page.
General Lighting Electronic Co., Ltd, LED Panel Light specifications for 60w 600×600, undated; originally downloaded from http://www.gl-leds.com/led-news/led-panel-light-60w-600x600-01.html on Jun. 6, 2011; 3 pages.
General Lighting Electronic Co., "LED Light Panel List", undated; originally downloaded from http://www.gl-leds.com/led-panel-light-list.html on Apr. 23, 2013; 2 pages.
Global Lighting Technologies Inc., "LED Edge Lighting", pamphlet from LIGHTFAIR International (LFI) on Apr. 23-25, 2013; 12 pages.
Green Led Lighting Solutions Inc., "LED Light Panel: Ultra Thin LED Light Box (Built in Power Supply)", product brochure, undated; downloaded from www.ledlightpanel.com on Apr. 23, 2013; 1 page.
Intematix Corporation, "Customer Case Study—Tech Lighting Unilume: Innovation for Undercabinet Lighting", brochure of Intematix for its Intematix ChromalitTM remote phosphor LEDs technology, undated; downloaded from www.intematix.com on Mar. 19, 3013; 2 pages.
Luminousfilm.com, a Knema, LLC company, "LED Light Panels Information", website description, undated; originally downloaded from http://www.luminousfilm.com/led.htm on Mar. 19, 2013; 5 pages.
Maxim Lighting; website description of LED flat lights, undated; originally downloaded from http://www.maximlighting.com/ on Mar. 19, 2013; 2 pages.
Maxim Lighting, "CounterMax StarStrand Counter, Accent & Task Lighting Solutions", copyright 2012; originally downloaded from http://www.maximlighting.com/catalog_pdf.aspx?c=brochure &n=LMXBRO1203.pdf on Mar. 19, 2013; pp. 1-5, 11-14; 10 pages.
MAXLITE, specification sheet for 2×4 flat light, pamphlet from LIGHTFAIR International (LFI) on May 17-19, 2011 ; 1 page.
MAXLITE, advertisement for maxLED Flat Panel 2×2, 2×4, and 1×4 models, for LIGHTFAIR International (LFI) on May 17-19, 2011; 5 pages.
Modular International Inc., "LED Panels", product brochure, undated; downloaded from http://www.modularinternational.com/literature.php on Mar. 6, 2009; 2 pages.
National Specialty Lighting, "LED Task Star", product brochure, undated; downloaded from http://www.nslusa.com/ on Mar. 19, 2013; 1 page.
Nicor Lighting "T2LED 2×2 Troffer", product brochure, undated; downloaded from nicorlighting.com/uploads/.../t2-led-2x2-troffer-lumen-maintenance.pdf on Apr. 25, 2013; 1 page.
Nicor Lighting, "2013 Catalog Multifamily, Assisted Living, & Hospitality Lighting Products", copyright 2013, pamphlet from LIGHTFAIR International (LFI) on Apr. 23-25, 2013; pp. 1-4, 31; 7 pages.
Noke LED Lighting Technology Co., Ltd., "Ceiling Light 650×650mm", website description, undated; originally downloaded from http://www.nokeled.com/products/Ceiling-light-650x650mm.html on Jun. 11, 2012; 2 pages.
Patent Cooperation Treaty, "Invitation to Pay Additional Fees and, Where Applicable, Protest Fee", partial international search report for international application No. PCT/US2012/038338, dated Sep. 19, 2012; 7 pages.

(56) References Cited

OTHER PUBLICATIONS

Patent Cooperation Treaty, "International Search Report", international search report for international application No. PCT/US2012/038338, dated Feb. 18, 2013; 7 pages.
Patent Cooperation Treaty, Invitation to Pay Additional Fees and, Where Applicable, Protest Fee, partial international search report for international application No. PCT/US2012/038315, dated Sep. 19, 2012; 9 pages.
Patent Cooperation Treaty, "International Search Report", international search report for international application No. PCT/US2012/038315, dated Feb. 13, 2013; 9 pages.
Rambus, "LED Light Bulbs", website description, Jan. 17, 2013; originally downloaded from http://www.rambus.com/us/technology/solutions/led-lightbulb/index.html?utm_source=Rambus+Contacts&utm campaign=99dc5a0773-Technology_Bulb_Imerz_Launch1 17 2013&utm_mejiunn=email on Feb. 12, 2013; 2 pages.
Shenzhen Borsche Electronic Co.,Ltd., "LED Panel Light", product catalog, undated; originally downloaded from http://cnhidee.en.made-in-china.com/product-group/pqeQkYCeXtVIQLED-Panel-Light-catalog-1.htnnl on Apr. 30, 2013; 3 pages.
Stellaray Technology Limited, "Flat LED Panel", published Mar. 19, 2012; downloaded from http://www.srleds.com/e/products/LED_Panel Lights/led_panel_lights.html on Apr. 12, 2012; 26 pages.
Taiwan T-Lux Technology Co., Ltd, "BTHx Series Specification Sheet", Issued Oct. 12, 2010 and Modified Mar. 1, 2011; downloaded from http://www.t-lux.com.tw on Nov. 2, 2011; 7 pages.
Tech Lighting, a Generation Brands Company, "Unilume LED Undercabinet", product brochure and installation instructions, undated; downloaded on www.techlighting.com on Mar. 19, 2013; 6 pages.
Unity Opto Technology Co., Ltd., "Product Specification: UNi Ceiling Lighting I 2020", Jan. 7, 2011; downloaded from http://www.unityopto.com.tw/ on Mar. 19, 2013; 5 pages.
Unity Opto Technology Co., Ltd., "Product Specification: Ceiling Lighting 6060", Nov. 24, 2010; downloaded from http://www.unityopto.com.tw/ on Mar. 19, 2013; 4 pages.
Zenaro "Axenia-Modul 600 40W", website description, undated; downloaded from http://europe.zenaroled.com/en/products/europe/office-lights/itemlist/category/82-axenia on Jun. 22, 2012; 1 page.
BANQ Technology Co., Ltd., "300*300 Second Generation LED Panel Light," website description, copyright 2013; downloaded from http://www.bangcn.com/product-141.html on Oct. 28, 2013; email received from website owner on Oct. 9, 2013; 6 pages.
BBF Hitech Intl Co., Ltd, "300×300×11mm," website description, copyright 2010; downloaded from http://www.bbfled.com/productshow_386.html on Oct. 28, 2013; email received from website owner on Sep. 7, 2013; 2 pages.
Bravoled Lighting Manufacturing Co., Limited, "Bravoled, BL-P6-10W ANS," website description, copyright 2010; downloaded from http://www.bravoled.com/html/prsO/t287-310/c565.html on Oct. 28, 2013; email received from website owner on Sep. 26, 2013; 2 pages.
Chinese CleanTech Components Company Ltd, CCTCC, "CTC-300/1200W," website description, undated; downloaded from http://www.cctcc-group.conn/productShow.asp?PicID=967 on Oct. 28, 2013; email received from website owner on Sep. 11, 2013; 2 pages.
Ecolux Doubletree, "LED Integrate Super Flatlight," website description, copyright 2003; downloaded from www.ecolux.com.cn/aspcms/product/2013-4-20/292.html on Aug. 30, 2013; 2 pages.
General Electric Company, "GE Lighting E-Catalogue," product brochure, copyright 1997-2013; http://catalog.gelighting.com/system/indoor-luminaires/recessed/lumination/?remea on Oct. 30, 2013; downloaded from 4 pages.
General Electric Company, "Infusion LED Modules System," website description, copyright 1997-2013; downloaded from http://www.gelighting.com/LightingWeb/emea/products/highlights/infusion-led-module/overview/#3 on Aug. 8, 2013; 1 page.
Heeber Lighting Co., Ltd., "Heeber 600×600mm, 26w LED panel_Heeber," website description, copyright 2005; downloaded from http://www.heeber.com/cp/html/?5.html on Oct. 28, 2013; email received from website owner on Oct. 8, 2013; 3 pages.
Hilton Electrical Co., Ltd., "Hilton LED Products 2013 List," copyright 2009; Product list received by email from website owner on Aug. 13, 2013; 45 pages.
HK Raymates Electronic Co., Ltd, "RM-COB15/30W-W," website description, undated; downloaded from http://www.raymates.com/index.php/product/view/649.html on Oct. 28, 2013; email received from website owner on Sep. 11, 2013; 1 page.
Keyuan Optoelectronic Co., Ltd, "Your Present Position: Display, KYZM12060," website description, undated; downloaded from http://www.zs-keyuan.com/en/displayproduct.html?proID=3068225 on Oct. 28, 2013; email received from website owner on Sep. 2, 2013; 2 pages.
Kindom Opto-Electronic Co., Ltd., "300*300 LED Panel Light (side shine)," website description, copyright 2002-2009; downloaded from http://www.kindomled.com/eng/productsview.asp?id=205 on Oct. 28, 2013; email received from website owner on Sep. 9, 2013; 2 pages.
Lamptop Optoelectronics Tech Co., Ltd. "LED Panel Light-LampTop Optoelectronics Technology Co., Ltd," website description, copyright 2009-2013; downloaded from http://www.lamptopled.com/Product/5928161511.html on Sep. 25, 2013; email received from website owner on Sep. 5, 2013; 2 pages.
NGE Technology Limited, "Products Introduction: 300*300mm LED panel light," website description, copyright 2011; downloaded from http://www.nge-led.com/products/NGE-P0303-518W/ on Oct. 28, 2013; email received from website owner on Sep. 17, 2013; 2 pages.
Ningbo KingsLED Electronics Co., Ltd, "LED ultrathin downlight & LED panel lighting," website description, undated; brochure and email from website owner sent on Jul. 30, 2013; 4 pages.
Ningbo Yoogir Energy Saving Technology Co., Ltd, "LED PL LAMP, LED PLAC, LED PLUG LIGHT, LED PL LIGHT, LED PANEL LIGHT, LED TUBE," website description, copyright 2003-2013; downloaded from http://www.yoogir.com/HK-PL6060.html on Oct. 24, 2013; email received from website owner on Oct. 17, 2013; 2 pages.
Senseled Technology Co., Limited, "RGB Wall & Ceiling & Dance Floor Panel," website description, undated; downloaded from http://www.senseled.com/product-detail.asp?Product_id=138 &Big_Class_id=93; downloaded from website owner on Oct. 29, 2013; email received from website owner on Oct. 10, 2013; 1 page.
Shanghai Goodsun Lighting Co. Ltd, "A. Ultrathin LED Panel Light 600nnm*600mm," website description, copyright 2011-2012; downloaded from http://www.shgoodsun.com/led-panel-light-600-600.htnnl on Oct. 24, 2013; email received from website owner on Oct. 18, 2013; 3 pages.
Shenzhen Aoser Lighting, "SMD2835 led panel light," website description, copyright 2010; downloaded from http://www.aoserled.com/en/Products_detailasp?I_D=326 on Oct. 28, 2013; email received from website owner on Aug. 2, 2013; 2 pages.
Shenzhen BANQ Technology Co., "600*600 front lighting led panel light _Shenzhen Banq Technology Co., Ltd," website description, copyright 2013; downloaded from http://www.banqcn.com/product-139.html on Oct. 28, 2013; email received from website owner on Aug. 5, 2013; 6 pages.
Shenzhen Boyao Optoelectronic Technology Co., Ltd, "Shenzhen Boyao Optoelectronic Technology.Co., Ltd.—LED High Bay Light, LED Panel Light," website description, copyright 1999-2013, downloaded from boyaotech.en.alibaba.com on Sep. 9, 2013; email received from website owner on Aug. 29, 2013; 3 pages.
Shenzhen Huadian Lighting Co., Ltd, "Professional Manufacturer of LED Tube, LED Panel Light, LED Down Lights, LED Spotlight, etc.," website description, undated; downloaded from http://www.hd-leds.com/products-detail.php?ProId1=81 on Oct. 28, 2013; email received from website owner on Sep. 2, 2013; 2 pages.
Shenzhen Loevet Lighting Co. Ltd, "Wholesale 600*600mm LED Panel Light Series from Loevet Lighting Co., Ltd in China," website description, copyright 2008-2013; downloaded from http://www.

(56) References Cited

OTHER PUBLICATIONS lvt-lighting.com/led-panel-light-36W-600x600mm.html on Oct. 28, 2013; email received from website owner on Sep. 6, 2013; 3 pages.
Shenzhen Wak Optoelectronic Co., Ltd, "High Brightness LED Panel Light 600×600mm," website description, undated; downloaded from http://www.wak-led.com/product/showproduct.php?lang=en&id=111 on Oct. 28, 2013; email received from website owner on Aug. 25, 2013; 2 pages.
Tsanli Lighting Co., Limited, "LED Panels-LED Light Panel_LED Panels-LED Light Panel Manufacturers & Suppliers," website description, copyright 2013; downloaded from http://www.sanli-led.com/LED_panel.aspx on Oct. 28, 2013; email received from website owner on Oct. 14, 2013; 8 pages.
Up-shine Lighting Co., Limited, "LED Panel Lamp, Dimmable LED Light, High Lumen LED Lamp, Up-Shine Lighting," website description, undated; downloaded from http://www.upshineled.com/5-led-panel-lamp.html on Oct. 24, 2013; email received from website owner on Oct. 14, 2013; 4 pages.
Westpac LED Lighting, Inc., "LED Panel Lights," website description, copyright 2013; downloaded from http://www.westpacled.com/products/led-panel-lights/ on Oct. 30, 2013; 1 page.
Newsen Electronics Technology Limited, "Newsen Technology, LED Manufacturer, LED Commercial Light, LED Home Light, LED Project Light," website description, copyright 2004-2009; downloaded from http://www.newsenlighting.com/productView.asp?Id=162 on Nov. 4, 2013; email received from website owner on Oct. 29, 2013; 3 pages.
Google Translation of DE 202012103430 U1—downloaded from www.google.com/patents on Oct. 18, 2014; 10 pages.
Google Translation of DE 102010006465A1—downloaded from www.google.com/patents on Nov. 1, 2013; 4 pages.
Google Translation of EP 2270387 B1—downloaded from www.google.com/patents on Nov. 5, 2013; 7 pages.
Alite Co., Ltd., "Products/DLC qualified LED panel_Alite co., Ltd-Led tube lighting, Led bulb, Led spotlights lights, Led panel-china Led Lighting, China Led manufacturer," website description, copyright 2008-2013; downloaded from http://www.aliteled.com/a/Products/dIcledpanel/ on Jan. 2, 2014; 2 pages.
Asia-Boslin Optoelectronics Sci & Tech Group Co., Ltd, "600×600mm 40W 5630 Samsung Ultra-Thin LED Panel Light", website description, copyright 2014; downloaded from www.simaoled.com/english/pro_show.asp?mid=2 &name=40W%2OLED%20Panel%20Light&pc1_id=13 &p_id=741&p_name=40W%2OLED%20Panel %20LighthE123 on Apr. 15, 2014; email received from website owner on Mar. 10, 2014; 7 pages.
Ecother Technology Limited, "LED Panel Light ET-PL-S6060-36W," website description, copyright 2007-2012; downloaded from http://ecother.com/showproducts.php?id=41 on Apr. 1, 2014; 2 pages.
Emerge DDP Engineered LED Solutions, "ProductsEmerge," website description, copyright 2014; downloaded from www.emergelighting.com/products/ on Feb. 19, 2014; 1 page.
HK Kstar Electronic Co., Ltd. "RGB 600*600 LED Panel Light," website description, undated; downloaded from http://www.kstar-lighting.com/product.asp?id=1675 on Jan. 2, 2014; email received from website owner on Sep. 25, 2013; 3 pages.
International Application No. PCT/US12/38315 International Preliminary Report on Patentability and Written Opinion of the International Searching Authority dated Nov. 19, 2013, Attached to International Publication No. WO2012/158894, Nov. 22, 2012; 12 pages.
International Application No. PCT/US12/38338 International Preliminary Report on Patentability and Written Opinion of the International Searching Authority dated Nov. 19, 2013, Attached to International Publication No. WO2012/158908, Nov. 22, 2012; 11 pages.
Kili-LED Lighting Limited, "LED Panel Light," website description, undated; downloaded from http://www.Kili-led.com/?producten/Product57/ on Apr. 1, 2014; email received from website owner on Mar. 24, 2014; 3 pages.
Light Green International Co., Ltd., "Light Green International Co., Ltd. The Largest Manufacturer of LED Panel Lights in China," website description, copyright 2010-2012; downloaded from http://light-green.cn/english/Product_Catalog_03_01.aspx?id=65 on Apr. 16, 2014; email received from website owner on Apr. 2, 2014; 2 pages.
OPUS Technology Development Co., Ltd., "600×1200mm LED Panel Light SOW," website description, undated; downloaded from http://www.opus-led.com/600x1200mnn-LED-Panel- Light-SOW.html on Mar. 12, 2014; email received from website owner on Mar. 10, 2014; 3 pages.
QuarkStar, "Light Shaping: An Innovative New Approach for SSL Luminaires," presentation from Strategies in Light conference on Feb. 25-27, 2014, undated; 32 pages.
Shenzhen CREP Optoelectronics Co., Ltd., "CREP Optoelectronic Co., Ltd.," website description, copyright 2010-2011; downloaded from http://www.crep-led.com/EN/products.aspx on Nov. 16, 2013; email received from website owner on Nov. 13, 2013; 2 pages.
Shenzhen King Star Opto-Electronic Co., Ltd, "China Ultra-thin Economical LED Panel Light supplier," website description, copyright 2005-2013; downloaded from http://www.ks-light.com/china-id293.html on Apr. 16, 2014; email received from website owner on Apr. 1, 2014; 5 pages.
Shenzhen Magreen Group Co., Ltd., "Shenzhen Magreen Lighting Technology Co., Limited," email attachment received from website owner on Apr. 1, 2014; undated; 3 pages.
Shenzhen Man Jia Technology Limited, "15w square led panel light with glass edge," website description, copyright 2011-2012; downloaded from http://www.manjia-lighting.com/detail/1Swsquareledpanellightwithgl_assedge.html#1# on Nov. 16, 2013; email received from website owner on Nov. 16, 2013; 7 pages.
Shenzhen Ming Light Co., Ltd, "Minglight Manufacturing Co; LtthLED Panel LighbLED Panel Light 600×600 1S&20&39W, IP54," website description, copyright 2011; downloaded from http://www.minglight.com.cn/LED%20Panel%20Light %20600x600%20%201S&20&39W,°/0201P54-pii-4S.htnnl on Nov. 16, 2013; email received from website owner on Nov. 14, 2013; 4 pages.
Shenzhen MJ International, "Energy Light Index," website description, undated; downloaded from http://www.energyledlight.com/index.asp on Apr. 15, 2014; email received from website owner on Feb. 17, 2014; 1 page.
Shenzhen Ruidisi Lighting Co., Ltd, "RDS-6060-Ruidisi Lighting (HK) Co., Limited," website description, copyright 2013; downloaded from http://www.rds-led.com/Products/Candle_Light_Series/Square_panel_light/rds11.html on Nov. 16, 2013; email received from website owner on Nov. 16, 2013; 2 pages.
Shine Technology Ltd, "Led light-led panel light, led bulb and waterproof led power supply manufacturer in China," website description, copyright 1999-2013, downloaded from http://shine-technology.en.alibaba.com on Dec. 23, 2013; email received from website owner on Nov. 25, 2013; 3 pages.
Star Light Technology Group (China) Limited, "LED Panel light 1200*600 (Full color)—LED Panel Light—China—STAR," website description, copyright 1995-2013; downloaded from www.starlight-led.com/sdp/865240/4/pd-4460524/6793633-1955803/LED_Panel_light_600_600_Full_colors.html#normal_img on Dec. 23, 2013; 2 pages.
Tonya Lighting Technology Co., Ltd., "Tonya Lighting Technology Co., Ltd," website description, copyright 2009; downloaded from http://www.tonyalight.com/Defaultaspx?PN:prd_view&ps: &pID=75466 on Nov. 15, 2013; email received from website owner on Nov. 15, 2013; 2 pages.
West Deer Technology Co., Limited, "Product Show," website description, copyright 2013; downloaded from http://wdeer-led.com/html/prsO/t287-310/c556.html on Apr. 15, 2014; email received from website owner on Mar. 3, 2014; 2 pages.

(56) References Cited

OTHER PUBLICATIONS

Patent Cooperation Treaty, "Invitation to Pay Additional Fees and, Where Applicable, Protest Fee", partial international search report for international application No. PCT/US2014/033352, dated Aug. 11, 2014; 6 pages.
Google Translation of DE 102010008359 A1—downloaded from www.google.com/patents on Oct. 17, 2013; 16 pages.
Google Translation of EP 1361391 A2—downloaded from www.google.com/patents on Oct. 17, 2013; 6 pages.
Google Translation of EP 1059484 A1—downloaded from www.google.com/patents on Oct. 17, 2013; 17 pages.
Patent Cooperation Treaty, "Notification of Transmittal of International Search Report and the Written Opinion of the International Searching Authority", international search report for international application No. PCT/US2014/033953, dated Aug. 13, 2014; 12 pages.
Thomson Scientific translation of WO 2009017117 A1—enclosed with international search report for international application No. PCT/US2014/033953, dated Aug. 13, 2014; 24 pages.
Google Translation of WO 2012/113005 A1—downloaded from www.google.com/patents on Oct. 17, 2013; 5 pages.
Patent Cooperation Treaty, "International Preliminary Report on Patentability", written opinion of the international searching authority for international application No. PCT/US2012/038315, dated Nov. 19, 2013; 12 pages.
Patent Cooperation Treaty, "International Preliminary Report on Patentability", written opinion of the international searching authority for international application No. PCT/US2012/038338, dated Nov. 19, 2013; 11 pages.
LEDCONN Corp., exhibitor at Lightfair 2014 Jun. 1-5, 2014, "iFITTM LED Light Panel", website copyright 2014; downloaded from http://ledconn.com/index.php/products/ifit-led-light-panel on Oct. 20, 2014; 5 pages.
The Aurora Group, exhibitor at Lightfair 2014 Jun. 1-5, 2014, VerseTile LED panels, website copyright 1999-2014, downloaded from http://gb.auroralighting.com/Products/Indoor-Luminaires/LED-Flat-Panels on Oct. 20, 2014, 4 pages.
Elumina Technology Inc., exhibitor at Lightfair 2014 Jun. 1-5, 2014, LED Panel Light G3, website copyright 2013, downloaded from http://www.eluminatech.com/pro/list2.php?cid=30&f=30&pa=30 on Oct. 20, 2014, 2 pages.
BrightView Technologies, exhibitor at Lightfair 2014 Jun. 1-5, 2014, Light Management/Angle Management products, website copyright 2014, downloaded from http://www.brightviewtechnologies.com/products/light-management/lightmanagementipage.aspx?id=1129 on Oct. 20, 2014, 2 pages.
Pinnacle Architectural Lighting, exhibitor at Lightfair 2014 Jun. 1-5, 2014, brochure for LINERO LED lighting product line, brochure downloaded from http://www.pinnacle-ltg.corn/downloads/linero/Linero_Brochure.pdf on Oct. 20, 2014, 20 pages.
TCL LED USA, exhibitor at Lightfair 2014 Jun. 1-5, 2014, LED Panel Light, website copyright 2013, downloaded from http://tclledusa.com/products/led-panel-light/ on Oct. 20, 2014, 3 pages.
Cougar LED Lighting, exhibitor at Lightfair 2014 Jun. 1-5, 2014, 2014, Cougar LED lighting catalog, catalog downloaded from http://www.cougar-lighting.de/en/downloads-english/catalogues.html on Oct. 20, 2014, 20 pages.
European Patent Office, "Communication Pursuant to Article 94(3) EPC", Examination report for European patent application 12726949.6, dated Feb. 2, 2015; 2 pages.
European Patent Office, Annex to the Communication Pursuant to Article 94(3) EPC, Examination report for European patent application 12726949.6, dated Sep. 17, 2015; 5 pages.
Non-Final Office Action issued in U.S. Appl. No. 13/473,918 dated Jan. 6, 2014, 19 pages.
Final Office Action issued in U.S. Appl. No. 13/473,918 dated Jun. 4, 2014, 16 pages.
Notice of Allowance issued in U.S. Appl. No. 13/473,918 dated Aug. 11, 2014.

Notice of the Reason for Refusal dated Mar. 15, 2016 corresponding to Japanese Patent Application No. 2014-511528, 7 pages.
English Translation of the Notice of the Reason for Refusal dated Mar. 15, 2016 corresponding to Japanese Patent Application No. 2014-511528, 6 pages.
Computer generated English translation of Registered Utility Model No. 3140783, transcribed from the Japan Platform of Patent Information, https://www.jplatpatinpit.go.jp/web/all/top/BTnnTopEnglishPage, on Apr. 22, 2016, 11 pages.
Computer generated English translation of Patent Application Laid-open No. 2011-138731, transcribed from the Japan Platform of Patent Information, https://www.jplatpatinpit.go.jp/web/all/top/BTnnTopEnglishPage, on Apr. 22, 2016, 32 pages.
Non-Final Office Action dated Apr. 26, 2016 corresponding to U.S. Appl. No. 14/480,262, 18 pages.
Applicant Initiated Interview Summary dated Jun. 16, 2016 corresponding to U.S. Appl. No. 14/480,262, 4 pages.
Notice of Allowance dated Jul. 29, 2016 corresponding to U.S. Appl. No. 14/480,262, 17 pages.
Non-Final Office Action dated May 4, 2016 corresponding to U.S. Appl. No. 14/554,919, 69 pages.
Non-Final Office Action dated Apr. 24, 2015 corresponding to U.S. Appl. No. 14/554,919, 18 pages.
Final Office Action dated Oct. 7, 2015 corresponding to U.S. Appl. No. 14/554,919, 36 pages.
Power Integrations—DER-384—Oct. 2013 https://led-driver.power.com/sites/default/files/PDFFiles/der384.pdf?Adsource=Aden_EEW%3felqTrack=true%futm_source=EEWeb&utm_medium=TechCommunity&utm_term=2014&utm_content=Content&utm_campaign=Powerintegrations, 41 pages.
Advisory Action dated Jan. 25, 2016 corresponding to U.S. Appl. No. 14/554,919, 4 pages.
Interview Summary dated Apr. 5, 2016 corresponding to U.S. Appl. No. 14/554,919, 12 pages.
Non-Final Office Action dated Apr. 7, 2016 corresponding to U.S. Appl. No. 14/246,823, 11 pages.
Applicant Initiated Interview Summary dated Jul. 8, 2016 corresponding to U.S. Appl. No. 14/246,823, 3 pages.
Non-Final Office Action dated Jan. 22, 2016 corresponding to U.S. Appl. No. 14/248,197, 10 pages.
Non-Final Office Action dated Sep. 1, 2015 corresponding to U.S. Appl. No. 14/254,822, 8 pages.
Final Office Action dated Mar. 9, 2016 corresponding to U.S. Appl. No. 14/254,822, 11 pages.
Notice of Allowance and Fee(s) Due and Examiner Initiated Interview Summary dated Apr. 5, 2016 corresponding to U.S. Appl. No. 14/618,665, 14 pages.
Non-Final Office Action dated Mar. 30, 2015 corresponding to U.S. Appl. No. 14/618,665, 9 pages.
Non-Final Office Action dated Sep. 15, 2015 corresponding to U.S. Appl. No. 14/618,665, 17 pages.
Applicant-Initiated Interview Summary dated Mar. 18, 2016 corresponding to U.S. Appl. No. 14/480,772, 3 pages.
Non-Final Office Action dated Dec. 18, 2015 corresponding to U.S. Appl. No. 14/480,772, 16 pages.
Final Office Action dated Jul. 14, 2016 corresponding to U.S. Appl. No. 14/480,772, 17 pages.
Examination Search Report dated Dec. 11, 2015 corresponding to Canadian Patent Application No. 2,835,213, 3 pages.
Canadian Intellectual Property Office, Examiner's Report under Subsection 30(2) of the Patent Rules, Examination Report for Canadian patent application 2,835,213, dated Apr. 22, 2015, 4 pages.
Notice of the Reason for Refusal dated Sep. 21, 2015 corresponding to Chinese Patent Application No. 201280024002.3, 10 pages.
English Translation of the Notice of the Reason for Refusal dated Sep. 21, 2015 corresponding to Chinese Patent Application No. 201280024002.3, 8 pages.
Notice of the Reason for Refusal dated Oct. 30, 2015 corresponding to Chinese Patent Application No. 201280023544.9, 6 pages.
English Translation of the Notice of the Reason for Refusal dated Oct. 30, 2015 corresponding to Chinese Patent Application No. 201280023544.9, 9 pages.

(56) References Cited

OTHER PUBLICATIONS

Non-Final Office Action/Requirement for Restriction/Election issued in U.S. dated No. 13/483,918 dated Nov. 14, 2012, 6 pages.
Non-Final Office Action issued in U.S. Appl. No. 13/483,918 dated Apr. 23, 2013, 9 pages.
Notice of Allowance issued in U.S. Appl. No. 13/483,918 dated Nov. 22, 2013, 9 pages.
Non-Final Office Action issued in U.S. Appl. No. 13/473,929 dated Apr. 10, 2015, 26 pages.
Final Office Action issued in U.S. Appl. No. 13/473,929 dated Oct. 22, 2015, 33 pages.
Advisory Action issued in U.S. Appl. No. 13/473,929 dated Mar. 30, 2016, 10 pages.
"Lamp Size and Comparison Features." Retrieved on Nov. 9, 2015, from http://www.grainger.com/tps/lighting_lamp_size_and_feature_comparison_pdf, 1 page.
Wilson, R., "Power Integrations LED driver is 88% efficient for 100W bulb replacement," ElectronicsWeekly.com, Sep. 2015, retrieved from the Internet: http://www.electronicsweekly.com/blost/led-luminaries/power-integrations-led-driver-is-889-efficient-for_100w-bulb-replacement-2012-09/, retrieved on Dec. 7, 2015, 3 pages.
Think Lumens, Not Watts: Buying Light bulbs in the 21st Century, EarthLED, retrieved from the Internet: https://www.earthled.com/pages/lumens-watts-and-buying-lightbulbs-in-the-21st-century, retrieved on Dec. 7, 2015, 5 pages.
Lumination LED Luminaires—Recessed LED Troffer—ET Series, GE imagination at work, retrieved from the Internet: www.gelighting.com/LightingWeb/na/solutions/indorr-lighting/recessed/lumination-et-series.jsp, retrieved on Dec. 7, 2015, 8 pages.
Google Translation of CN 201628158—downloaded from www.google.com/patents on Sep. 22, 2015; 3 pages.
LEDsupply, "Understanding LED Drivers and How to Choose the Right One," undated, downloaded from http://www.ledsupply.com/blog/understanding-led-drivers/ on Jun. 12, 2015, 5 pages.
Notice of Allowance issued in U.S. Appl. No. 14/497,943 dated Jun. 22, 2016, 13 pages.
Non Final Office Action in U.S. Appl. No. 14/497,943 dated Mar. 27, 2015, 9 pages.
Non Final Office Action in U.S. Appl. No. 14/497,943 dated Aug. 28, 2015, 14 pages.
Final Office Action in U.S. Appl. No. 14/497,943 dated Jun. 24, 2015, 8 pages.
List of References considered by examiner in U.S. Appl. No. 14/497,943 dated Jul. 1, 2016.
Examiner's Amendment and List of Reference and considered by examiner in U.S. Appl. No. 14/497,943 dated Jul. 20, 2016, 3 pages.
Power integrations DER-323 18 W A19 LED Driver Using LNK460VG, Figure 1 and figure 2, p. 4 http://www.power.com/sites/default/files/PDFFiles/der323.pdf Jun. 21, 2012, 39 pages.
Non-Final Office Action dated May 26, 2016 corresponding to U.S. Appl. No. 14/517,676, 11 pages.
Notice of Allowance issued in U.S. Appl. No. 15/092,186 dated Jul. 18, 2016, 9 pages.
Notice of Allowance issued in U.S. Appl. No. 15/158,353 dated Jul. 5, 2016, 10 pages.
Applicant Initiated Interview Summary dated Aug. 18, 2016 corresponding to U.S. Appl. No. 14/517,676, 9 pages.
Shenzhen Bonld Electronics Co., Ltd., Quotation of DLC LED Panel, New Price List of DLC Panel-Bonld, received from the vendor on Nov. 17, 2015, 1 page.
Shenzhen Huadian Lighting Co., Ltd, "Top 2 Bestseller of LED Panel Light in China", downloaded from http://www.hd-leds.com/products.php. On Aug. 17, 2016; similar brochure distributed during Hong Kong International Lighting Fair, Autumn Edition, Oct 27-30, 2015, 4 pages.
Syhdee, "LED Panel Light", Product Specification of Flat Panel of Shenzhen Syhdee Co., Ltd., product specification was received by email from Shenzhen Syhdee Co., Ltd. on Aug. 3, 2016.
Canadian Intellectual Property Office, Examiner's Report under Subsection 30(2) of the Patent Rules, Examination Report for Canadian patent application 2,835,213, dated Jun. 30, 2016, 4 pages.
Notice of Allowance issued in U.S. Appl. No. 14/254,822 dated Aug. 26, 2016, 35 pages.
Applicant Initiated Interview Summary issued in U.S. Appl. No. 14/554,919, dated Sep. 12, 2016, 12 pages.
Notice of Allowance issued in U.S. Appl. No. 14/246,823 dated Sep. 16, 2016, 18 pages.
Final Office Action issued in U.S. Appl. No. 14/554,919 dated Oct. 3, 2016, 31 pages.
Notice of Allowance dated Sep. 16, 2016 2016 issued in U.S. Appl. No. 14/246,823, 18 pages.
Supplemental Notice of Allowance dated Oct. 23, 2016 issued in U.S. Appl. No. 14/246,823.
Notice of Allowance issued in U.S. Appl. No. 14/517,676 dated Nov. 1, 2016, 28 pages.
Notice of Allowance issued in U.S. Appl. No. 15/241,744 dated Oct. 24, 2016, 24 pages.
Official Letter dated Sep. 6, 2016 for Taiwan Patent Application No. 101117573, "Flat Panel Lighting Device and Driving Circuitry", 4 pages.
Partial translation of Official Letter dated Sep. 6, 2016 for Taiwan Patent Application No. 101117573, "Flat Panel Lighting Device and Driving Circuitry", 1 page.
Search Report dated Sep. 6, 2016 for Taiwan Patent Application No. 101117573, "Flat Panel Lighting Device and Driving Circuitry", 1 page.
Information Disclosure Statement filed in U.S. Appl. No. 15/269,694 dated Sep. 19, 2016, 17 pages.
Transmittal Letter for Information Disclosure Statement filed in U.S. Appl. No. 15/269,694 dated Sep. 19, 2016, 2 pages.
European Patent Office Action dated Nov. 25, 2016 for EP Application No. 12726949.6, "Flat Panel Lighting Device and Driving Circuitry", 6 pages.
European Notice of Allowance issued in European Application No. 12 726 949.6, dated Jun. 23, 2017, 63 pages.
Japanese Notice of Allowance (with English Translation) issued in Japanese Application No. 2014-511528, dated Jul. 11, 2017, 2 pages.
Taiwanese Notice of Allowance (with English Translation) issued in Taiwanese Application No. 101117573, dated May 23, 2017, 3 pages.

* cited by examiner

FLAT PANEL LIGHTING DEVICE AND DRIVING CIRCUITRY

RELATED APPLICATION DATA

This application is a continuation of U.S. Ser. No. 15/241744, entitled "FLAT PANEL LIGHTING DEVICE AND DRIVING CIRCUITRY," filed Aug. 19, 2016, which is a continuation of U.S. Ser. No. 14/497,943, entitled "FLAT PANEL LIGHTING DEVICE AND DRIVING CIRCUITRY," filed Sep. 26, 2014, which is a continuation of U.S. Ser. No. 13/473,929, entitled "FLAT PANEL LIGHTING DEVICE AND DRIVING CIRCUITRY," filed May 17, 2012. The present application claims benefit of U.S. Provisional App. No. 61/487,253, filed May 17, 2011, which is incorporated by reference in its entirety. The present application also claims benefit of U.S. Provisional App. No. 61/579,472, filed Dec. 22, 2011, which is incorporated by reference in its entirety.

FIELD OF THE INVENTION

The present invention relates generally to lighting assemblies, and more particularly to a versatile, substantially flat panel light emitting diode lighting assembly and associated driving circuitry.

BACKGROUND

For years, lighting systems, such as ceiling mounted lighting fixtures or luminaires, have made use of fluorescent lamps and/or incandescent lamps. In addition to the lamps, lighting systems typically include an assembly of components, such as ballasts and reflectors. Luminaires that incorporate fluorescent lamps are the most commonly used commercial light sources due to their relatively high efficiency, diffuse light distribution characteristics, and long operating life. Luminaires that incorporate light emitting diodes are emerging as an attractive alternative to fluorescent lamp luminaires, providing marked improvements in efficiency and operating life.

Over the lifetime of a lighting system, for example, a commercial lighting system, the expenditures associated with operating and maintaining the system can be significant. As lighting fixtures age and deteriorate, the light-emitting ability degrades and the light output per unit of consumed electrical energy is significantly reduced. Modern ballasts, lamps and reflectors are available that can significantly enhance the light-emitting ability of the lighting system and also significantly enhance the energy efficiency by reducing the power consumption. As a result, the light output could be increased, while simultaneously reducing the associated energy costs. In many applications, long operating life, which reduces the burden of maintaining or replacing light fixtures, is seen as an important characteristic.

SUMMARY OF INVENTION

One aspect of the disclosed technology relates to a light fixture comprising a frame having a thickness of no more than about 1.0 inches; a substantially flat light emitting diode (LED) panel disposed within the frame, the substantially flat LED panel including an array of LEDs disposed adjacent at least one edge of the frame; and power and control circuitry for driving the array of LEDs housed entirely within the frame at an edge of the frame, the power and control circuitry including an LED driver configured to convert an AC input from an external AC power supply into a DC output; wherein the power and control circuitry has a length and a width, wherein the length-to-width ratio is at least 5 to 1.

One aspect of the disclosed technology relates to a light fixture comprising a frame configured to define a first channel, wherein the frame has a thickness of no more than about 1.0 inches; a substantially flat light emitting diode (LED) panel disposed within the frame and including an array of LEDs supported by a wall of a second channel located at an edge of the frame, wherein the wall of the second channel is offset from the edge of the frame; and power and control circuitry for driving the array of LEDs disposed within the first channel, the power and control circuitry including an LED driver configured to convert an AC input from an external AC power supply into a DC output; wherein the power and control circuitry comprises long, narrow circuitry having a length-to-width ratio of at least 5 to 1 and sized to be positioned within the first channel, and includes a circuit board.

One aspect of the disclosed technology relates to a light fixture comprising a frame configured to define a first channel and a second channel on opposite first and second sides of the frame, and a third channel and a fourth channel on remaining third and fourth sides of the frame, wherein the frame is rectangular; a substantially flat light emitting diode (LED) panel disposed within the frame, including a first array of LEDs disposed adjacent the first side of the frame and a second array of LEDs disposed adjacent the second side of the frame, wherein the first channel is configured to support the first array of LEDs and the second channel is configured to support the second array of LEDs; and first and second power and control circuitry respectively disposed within the third channel and the fourth channel, wherein the first and second power and control circuitry respectively drive the first array of LEDs and the second array of LEDs; wherein each of the first and second power and control circuitry includes an LED driver configured to convert an AC input from an external AC power supply into a DC output; and wherein each of the first and second power and control circuitry has a length and a width, wherein the length-to-width ratio is at least 5 to 1.

The present application is directed to a light fixture including a light emitting diode panel and associated driving circuitry. In accordance with one aspect of the disclosed technology, the light fixture includes power circuitry sized and configured to be housed within the frame of the light fixture. In accordance with one aspect, the light fixture can include multiple configurations of light emitting diode (LED) arrays that can be operated alternately. In accordance with another aspect, the light fixture can include multiple drivers operatively coupled to a LED array, where the drivers can be selectively operated to drive the LED array.

One aspect of the disclosed technology relates to a light fixture that includes a frame; a light emitting diode (LED) panel disposed within the frame; and power circuitry disposed within the frame, the power circuitry being configured to electrically couple the substantially flat LED panel to an external power supply.

According to one feature, the power circuitry is sized to be positioned within a channel defined by the frame.

According to one feature, the power circuitry includes driving circuitry configured to convert an AC input into a DC output suitable for powering the LED panel.

According to one feature, the power circuitry has a length and a width, wherein the length-to-width ratio is at least 5 to 1.

According to one feature, the power circuitry has a length and a width, wherein the length-to-width ratio is at least 10 to 1.

According to one feature, at least a portion of the frame defines a first channel configured to support the power circuitry.

According to one feature, at least a portion of the frame is configured to support an array of LEDs disposed adjacent to an edge of the frame.

According to one feature, the first channel is configured to support the array of LEDs.

According to one feature, at least a portion of the frame defines a second channel configured to support the array of LEDs.

According to one feature, at least a portion the frame is configured to support electrical connectors between the power circuitry and the array of LEDs.

According to one feature, the power circuitry includes an array of circuit modules supported by the first channel.

According to one feature, the first channel has a height of no more than about 0.5 inches.

According to one feature, the first channel has a width of no more than about 1.0 inches.

According to one feature, at least a portion of the frame defines a second channel configured to support the power circuitry.

According to one feature, the power circuitry within the second channel has a length of about 12 inches.

According to one feature, at least a portion of the frame defines a third channel configured to support an array of LEDs disposed adjacent at least one side of the frame.

According to one feature, the power circuitry includes a LED driver having a length, a width and a height, wherein the length is about 12 inches, the width is about 1.0 inches and the height is about 0.5 inches.

According to one feature, the LED panel is edge lit.

According to one feature, the LED panel includes a plurality of LEDs disposed adjacent at least one edge of the frame.

According to one feature, the frame is rectangular and the LED panel includes an array of LEDs incorporated into at least two sides of the frame.

According to one feature, the LED panel includes: an optically-transmissive panel; and an array of LEDs disposed adjacent at least one edge of the frame and disposed adjacent the optically transmissive panel.

According to one feature, the LED panel includes an optically-transmissive panel; and an array of LEDs disposed across a first surface of the optically-transmissive panel.

According to one feature, the array of LEDs is disposed across substantially the entire first surface of the optically-transmissive panel.

According to one feature, the frame of the light fixture has a thickness of no more than about 0.5 inches.

According to one feature, the frame of the light fixture has a thickness of no more than about 1.0 inches.

According to one feature, the frame is rectangular and the LED panel includes: a light guide plate; a first array of LEDs incorporated into a first side of the frame adjacent a first side of the light guide plate, the first array of LEDs emitting light focused along a first direction; a second array of LEDs incorporated into a second side of the frame adjacent a second side of the light guide plate, the second array of LEDs emitting light focused along a second direction that is opposite the first direction; a first brightness enhancement film (BEF) positioned adjacent the light guide plate and configured to collimate light emitted by the first array of LEDs; and a second BEF positioned adjacent the first BEF and configured to collimate light emitted by the second array of LEDs.

According to one feature, the power circuitry includes a controller configured to control the intensity of the light emitted by the LED panel.

According to one feature, the LED panel includes: a first configuration of LEDs; and a second configuration of LEDs.

According to one feature, the power circuitry is configured to power the first configuration of LEDs for a first time period and to power the second configuration of LEDs for a second time period equal to the first time period.

According to one feature, the LED panel includes a third configuration of LEDS, wherein the power circuitry is configured to power the first configuration of LEDs for a first time period, to power the second configuration of LEDs for a second time period equal to the first time period, and to power the third configuration of LEDs for a third time period equal to the first time period.

According to one feature, the power circuitry is configured to alternatively power the first configuration of LEDs and the second configuration of LEDs over a cyclical time period including the first time period and the second time period.

According to one feature, the first configuration of LEDs and the second configuration of LEDs are arranged in an alternating arrangement.

According to one feature, the first configuration of LEDs is arranged in a first row and the second configuration of LEDs is arranged in a second row adjacent the first row.

According to one feature, the first configuration of LEDs and the second configuration of LEDs are arranged in a first row and a second row below the first row.

According to one feature, the first configuration of LEDs and the second configuration of LEDs are arranged in a pair of rows, wherein each row of the pair of rows includes the first configuration of LEDs and the second configuration of LEDs arranged in an alternating arrangement.

According to one feature, the first configuration of LEDs and the second configuration of LEDs are arranged in a pair of rows in an alternating arrangement.

According to one feature, the first configuration of LEDs is arranged in a first row on a first side of the frame and the second configuration of LEDs is arranged in a second row on a second side of the frame opposite the first side of the frame.

According to one feature, first configuration of LEDs includes a first array on a first side of the frame and a second array on a second side of the frame opposite the first side of the light frame.

According to one feature, the second configuration of LEDs includes a third array on a third side of the frame and a fourth array on a fourth side of the frame opposite the third side of the light frame.

According to one feature, the first configuration of LEDs includes a first array on a first side of the frame and a second array on a second side of the frame adjacent the first side of the light frame.

According to one feature, the second configuration of LEDs includes a third array of LEDs on a third side of the frame opposite the first side of the frame and a fourth array of LEDs on a fourth side of the frame opposite the second side of the frame.

According to one feature, the first configuration of LEDs and the second configuration of LEDs are arranged in a pair of arrays on opposite sides of the frame, wherein the first configuration of LEDs and the second configuration of LEDs are arranged in an alternating arrangement in the pair of arrays on opposite sides of the light fixture.

According to one feature, the power circuitry comprises a first LED driver operatively coupled to the first configuration of LEDs and a second LED driver operatively coupled to the second configuration of LEDs.

According to one feature, the first LED driver is configured to selectively power the first configuration of LEDs and the second LED driver is configured to selectively power the second configuration of LEDs According to one feature, the power circuitry includes a controller operatively coupled to the first LED driver and the second LED driver, wherein the controller is configured to control the first LED driver and the second LED driver to power the first configuration of LEDs for a first time period and to power the second configuration of LEDs for a second time period equal to the first time period.

According to one feature, the power circuitry includes a controller operatively coupled to the first LED driver and the second LED driver, wherein the controller is configured to monitor failure of the first LED driver and the second LED driver.

According to one feature, the power circuitry comprises a first LED driver operatively coupled to the first configuration of LEDs and the second configuration of LEDs, and a second LED driver operatively coupled to the first configuration of LEDs and the second configuration of LEDs.

According to one feature, the first LED driver is configured to selectively power the first configuration of LEDs and the second configuration of LEDs, and the second LED driver is configured to selectively power the first configuration of LEDs and the second configuration of LEDs.

According to one feature, the power circuitry includes a controller operatively coupled to the first LED driver and the second LED driver, wherein the controller is configured to control the first LED driver and the second LED driver to power the first configuration of LEDs for a first time period and to power the second configuration of LEDs for a second time period equal to the first time period.

According to one feature, the power circuitry includes a controller operatively coupled to the first LED driver and the second LED driver, wherein the controller is configured to monitor failure of the first LED driver and the second LED driver.

According to one feature, the controller is configured to selectively activate the second LED driver to power the first configuration of LEDs and the second configuration of LEDs upon detection of failure or malfunction by the first LED driver.

Another aspect of the disclosed technology relates to a light fixture that includes a first set of light emitting diodes (LEDs); a second set of light emitting diodes (LEDs); an optically transmissive panel, each of the first set of LEDs and the second set of LEDs being disposed adjacent to an edge of the optically transmissive panel; and driving circuitry operatively coupled to the first set of LEDs and the second set of LEDs and an associated power supply, wherein the driving circuitry is configured to selectively power the first set of LEDs and the second set of LEDs in an alternating manner.

According to one feature, the driving circuitry is configured to power the first set of LEDs for a first time period and to power the second set of LEDs for a second time period equal to the first time period.

According to one feature, the light fixture includes a third set of light emitting diodes (LEDs), and the driving circuitry is configured to power the first set of LEDs for a first time period, to power the second set of LEDs for a second time period equal to the first time period, and to power the third set of LEDs for a third time period equal to the first time period.

According to one feature, the first set of LEDs and the second set of LEDs are arranged in a single row in an alternating arrangement.

According to one feature, the first set of LEDs is arranged in a first row and the second set of LEDs is arranged in a second row adjacent the first row.

According to one feature, the first set of LEDs and the second set of LEDs are arranged in a first row and a second row below the first row.

According to one feature, the first set of LEDs and the second set of LEDs are arranged in a pair of rows, wherein each row of the pair of rows includes the first set of LEDs and the second set of LEDs arranged in an alternating arrangement According to one feature, the first set of LEDs and the second set of LEDs are arranged in a pair of rows in an alternating arrangement.

According to one feature, the first set of LEDs is arranged in a row on a first side of the optically transmissive panel and the second set of LEDs is arranged in a row on a second side of the optically transmissive panel opposite the first side of the optically transmissive panel.

According to one feature, the first set of LEDs includes a first array on a first side of the light fixture and a second array on a second side of the light fixture opposite the first side of the light fixture.

According to one feature, the second set of LEDs includes a third array on a third side of the light fixture and a fourth array on a fourth side of the light fixture opposite the third side of the light fixture.

According to one feature, the first set of LEDs includes a first array on a first side of the light fixture and a second array on a second side of the light fixture adjacent the first side of the light fixture.

According to one feature, the second set of LEDs includes a third array of LEDs on a third side of the light fixture opposite the first side of the light fixture and a fourth array of LEDs on a fourth side of the light fixture opposite the second side of the light fixture.

According to one feature, the first set of LEDs and the second set of LEDs are arranged in a pair of arrays on opposite sides of the light fixture, wherein the first set of LEDs and the second set of LEDs are arranged in an alternating arrangement in the pair of arrays on opposite sides of the light fixture.

According to one feature, the driving circuitry comprises a first LED driver operatively coupled to the first set of LEDs and a second LED driver operatively coupled to the second set of LEDs.

According to one feature, the first LED driver is configured to selectively power the first set of LEDs and the second LED driver is configured to selectively power the second set of LEDs.

According to one feature, the driving circuitry includes a controller operatively coupled to the first LED driver and the second LED driver, wherein the controller is configured to control the first LED driver and the second LED driver to power the first set of LEDs for a first time period and to power the second set of LEDs for a second time period equal to the first time period.

According to one feature, the driving circuitry includes a controller operatively coupled to the first LED driver and the second LED driver, wherein the controller is configured to monitor failure of the first LED driver and the second LED driver.

According to one feature, the driving circuitry comprises a first LED driver operatively coupled to the first set of LEDs and the second set of LEDs, and a second LED driver operatively coupled to the first set of LEDs and the second set of LEDs.

According to one feature, the first LED driver is configured to selectively power the first set of LEDs and the second set of LEDs, and the second LED driver is configured to selectively power the first set of LEDs and the second set of LEDs.

According to one feature, the driving circuitry includes a controller operatively coupled to the first LED driver and the second LED driver, wherein the controller is configured to control the first LED driver and the second LED driver to power the first set of LEDs for a first time period and to power the second set of LEDs for a second time period equal to the first time period.

According to one feature, the driving circuitry includes a controller operatively coupled to the first LED driver and the second LED driver, wherein the controller is configured to monitor failure of the first LED driver and the second LED driver.

According to one feature, the controller is configured to activate the second LED driver to power the first set of LEDs and the second set of LEDs upon detection of failure of the first LED driver.

According to one feature, the controller is configured to selectively activate the second LED driver to power the first set of LEDs and the second set of LEDs upon detection of failure or malfunction by the first LED driver.

According to another aspect of the disclosed technology, a light fixture includes an array of light emitting diodes (LEDs); and driving circuitry operatively coupled to the array of LEDs, wherein the driving circuitry includes: a first LED driver selectively operatively coupled to the array of LEDs and a second LED driver selectively operatively coupled to the array of LEDs; and a controller operatively coupled to the first LED driver and the second LED driver, wherein the controller is configured to selectively activate the second LED driver to power the array of LEDs upon detection of failure or malfunction by the first LED driver.

According to one feature, the controller is configured to selectively activate the first LED driver to power the array of LEDs upon detection of failure of malfunction by the second LED driver.

Another aspect of the disclosed technology relates to a light fixture that includes a frame; a light emitting diode (LED) panel disposed within the frame, wherein the LED panel includes: a first configuration of light emitting diodes (LEDs); and a second configuration of light emitting diodes (LEDs); and driving circuitry operatively coupled to the first configuration of LEDs and the second configuration of LEDs, wherein the driving circuitry is configured to selectively power the first configuration of LEDs and the second configuration of LEDs in an alternating manner.

Another aspect of the disclosed technology relates to a method for extending rated life of a light emitting diode (LED) light fixture, where the LED light fixture having at least one array of LEDs. The method includes providing a first LED driver selectively operatively coupled to the at least one array of LEDs; providing a second LED driver selectively operatively coupled to the at least one array of LEDs; electrically coupling the first LED driver to the at least one array of LEDs and; monitoring the first LED driver for failure, malfunction or reduced performance; if failure, malfunction or reduced performance is detected for the first LED driver, electrically coupling the second LED driver to the at least one array of LEDs and electrically decoupling the first LED driver from the at least one array of LEDs.

Another aspect of the disclosed technology relates to a method of extending rated life of a light emitting diode (LED) light fixture. The method includes providing a first configuration of LEDs; providing a second configuration of LEDs; and selectively powering the first configuration of LEDs and the second configuration of LEDs in an alternating manner.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION

Figure 1:
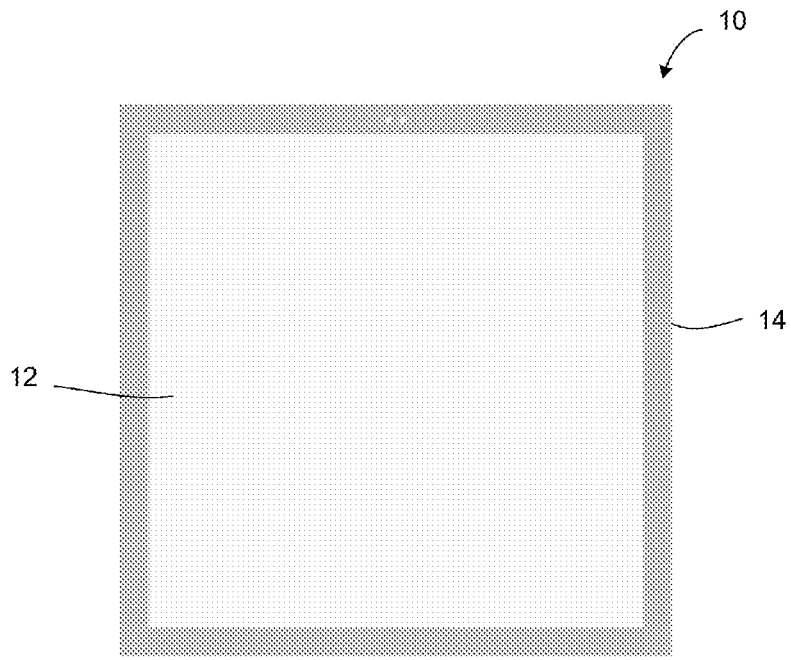
FIG. 1 is a diagrammatic illustration of a LED panel light fixture in accordance with one aspect of the disclosed technology.
Figure 2:
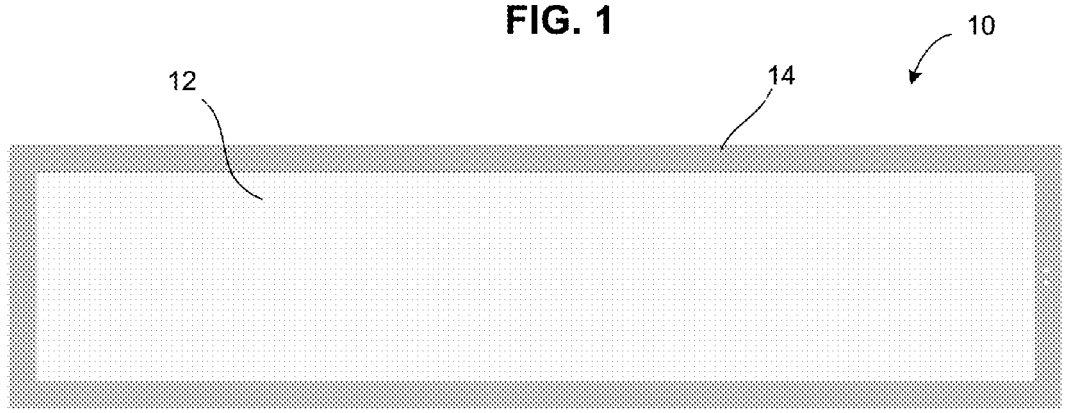
FIG. 2 is a diagrammatic illustration of a LED panel light fixture in accordance with one aspect of the disclosed technology.
Figure 3:
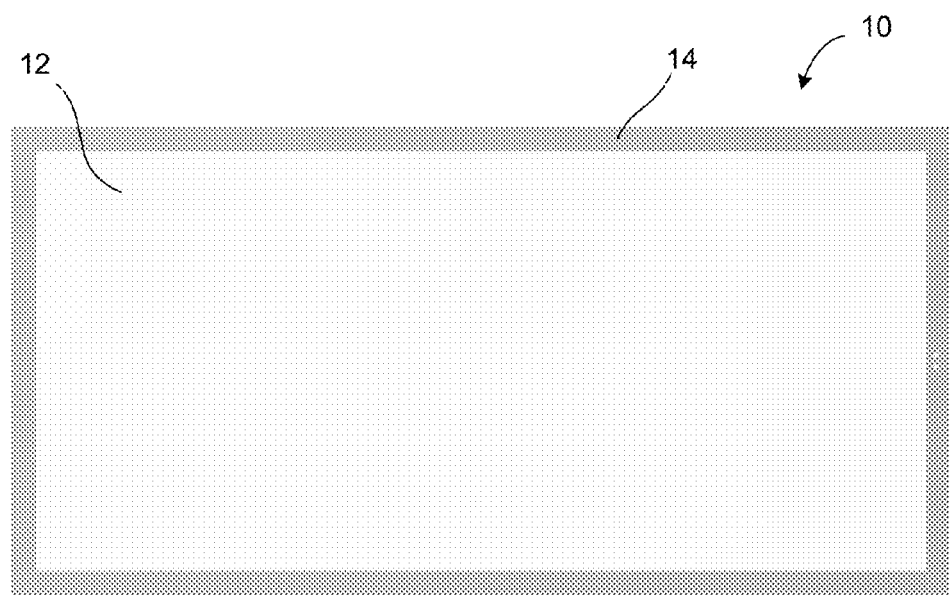
FIG. 3 is a diagrammatic illustration of a LED panel light fixture in accordance with one aspect of the disclosed technology.
Figure 4:
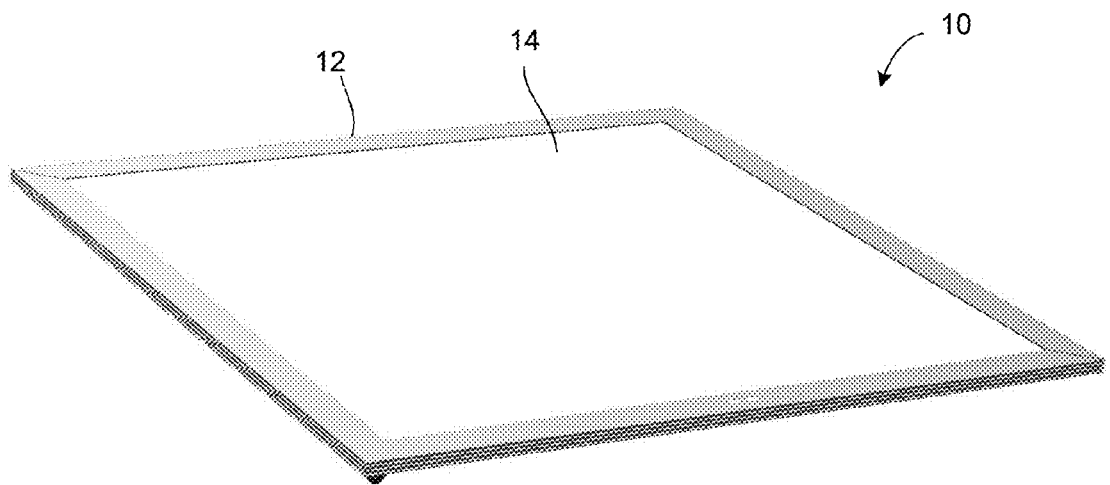
FIG. 4 is a perspective view of a LED panel light fixture in accordance with one aspect of the disclosed technology.
Figure 5:
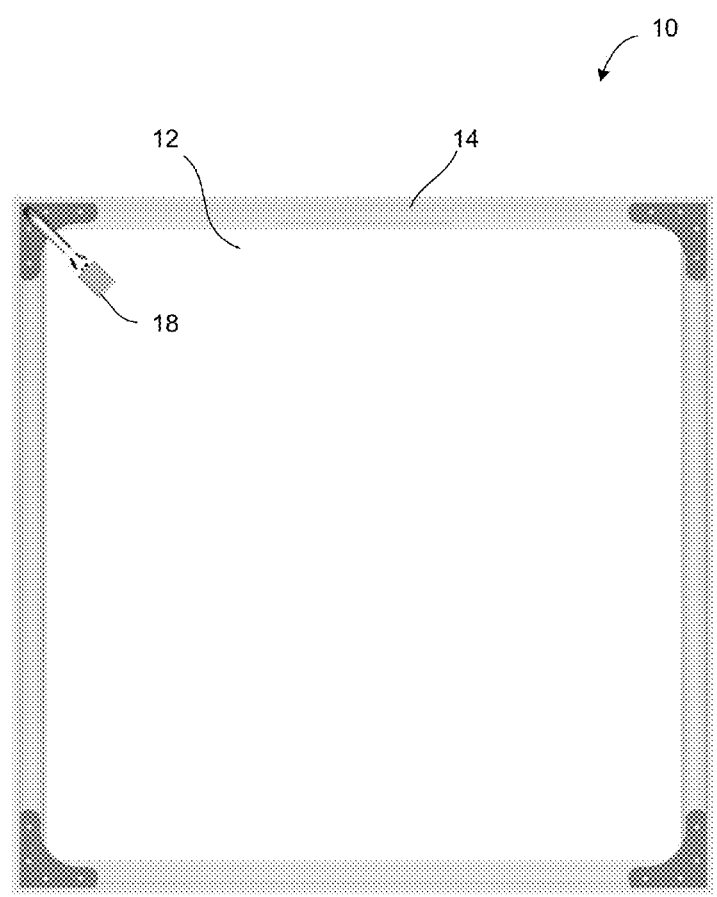
FIG. 5 is a rear view of a LED panel in accordance with one aspect of the disclosed technology.
Figure 6:
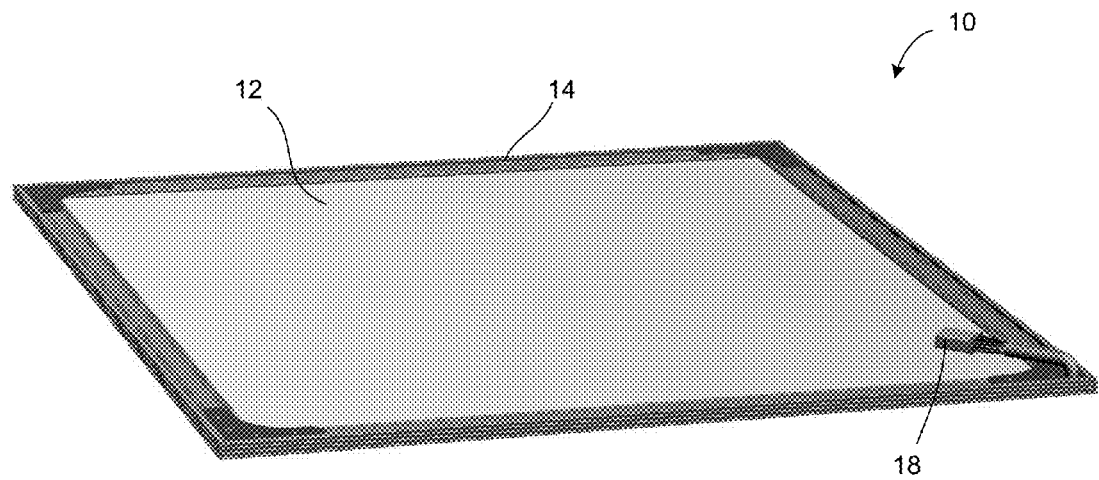
FIG. 6 is a rear perspective view of a LED panel in accordance with one aspect of the disclosed technology.

To illustrate aspects of the disclosed technology in a clear and concise manner, the drawings may not necessarily be to scale and certain features may be shown in somewhat schematic form.

A growing sophistication about the economics of lighting has emerged, and with it, recognition that luminous efficacy, or lumens per watt, is not the only important variable in designing and maintaining cost-effective, quality lighting. Lamp life is another important consideration. Service life is increasingly a driver in the development of new lamps and lighting systems. More lamp manufacturers are using life to distinguish their own products from those of their competitors.

Lamp packaging typically states the manufacturer's determination of lamp life, called rated life, usually in hours. The most straightforward interpretation of these ratings is arguably that they tell us how long the lamp will operate before it fails ("burns out"). But the definition of life is different for different lamp types.

Incandescent lamp life is measured by operating a sample of lamps continuously in a specified position and at a specified voltage. The number of burning hours at which half the lamps have failed is considered the rated life of the lamps. Fluorescent lamps can be tested while operating at a specified temperature (e.g., 25° C./77° F.) on a continuous 3-hour-on, 20-minute-off cycle, with a standard ballast circuit that controls the current. As with incandescent lamps, rated life is the elapsed number of operating hours at which half of the lamps in a sample have burned out.

Light Emitting Diode (LED) light sources typically do not fail in the sense that other sources do. Over time, however, their light output can decrease until they are no longer useful for a given purpose. LEDs often last hundreds of times longer than incandescent bulbs and fluorescent tubes—up to 100,000 hours.

Because LEDs require much smaller voltages of direct current, another factor that reduces the apparent long life of LEDs is the need for auxiliary electronics and equipment to house and operate these sources. Because electrical power commercially available in the United States is in the form of alternating current, LEDs require direct current converters. Such devices may have rated lives significantly shorter than the LEDs with which they are used. Higher voltage and high temperatures can also increase lumen depreciation in LEDs.

In addition, while some substantially flat LED panel lighting fixtures have been employed, these lighting fixtures make use of an AC-to-DC power converter module external to the fixture (e.g., extending outward from the back surface of the fixture). A power converter module external to the lighting fixture limits design flexibility in integrating LED flat panel fixtures or luminaires into a range of applications, and adds complexity to installation. For example, in installations in which a lighting fixture would be surface mounted in a visible location, there would be no out-of-view place for ancillary equipment such as a power converter.

The present disclosure recognizes shortcomings associated with conventional fluorescent lamp and incandescent lamp lighting systems. In addition, the present disclosure recognizes potential shortcomings with LED-based lighting assemblies and associated power circuitry, and provides an improved lighting fixture and associated power circuitry.

The present disclosure recognizes that the operating life on an entire lighting product or system must be considered, rather than just the potentially-promising long-rated life of LEDs within the lighting product or system. Besides improving the effects of lumen depreciation of LEDs, the present disclosure reduces the likelihood of catastrophic failure of other parts of the lighting product or system, including in particular a power supply or driver for the LEDs. As is described more fully below, the present application is directed to a light fixture including a light emitting diode panel and associated driving circuitry. In accordance with one aspect of the disclosed technology, the light fixture includes power circuitry configured to be housed within the frame of the light fixture. In accordance with one aspect, the light fixture can include multiple configurations of light emitting diode (LED) arrays that can be operated alternately. In accordance with another aspect, the light fixture can include multiple drivers operatively coupled to a LED array, where the drivers can be selectively operated to drive the LED array. In accordance with another aspect, the output of LED arrays can be adjusted to maintain lumen brightness and uniformity.

Referring now to FIGS. 1-9B, an exemplary embodiment of a light fixture 10 having a light emitting diode (LED) panel 12 is provided. In one embodiment, the LED panel 12 is a substantially flat LED panel (also referred to simply as a LED panel). The term "substantially flat LED panel" as used in connection with the description of the various embodiments, is meant to include LED panels having a thickness that is substantially less than the length and width of the panel. The term "LED panel fixture," as used in connection with the description of the various embodiments, denotes a light fixture 10 that incorporates a substantially flat LED panel. LED panel fixtures may be of slightly non-uniform thickness due to the configuration of the LED panel or of another part of the light fixture 10. For example, an LED panel fixture can include a frame (designated generally as 14) having a thickness that is greater than the thickness of the LED panel 12.

As shown in the various figures, the light fixture 10 includes a frame 14 that surrounds the LED panel 12. The frame 14 provides structural support, contains components of the LED panel fixture such as arrays, strips, or bars of LEDs 20 and the power circuitry (also referred to as driving circuitry, and as LED power circuitry or LED driving circuitry) (designated generally as 16), and provides heat dissipation. As is described more fully below, the frame can be configured to house or otherwise support LED power circuitry as well as associated wiring and electrical connections between the power circuitry and the LED arrays.

The light fixture 10, including the LED panel 12 may take on a variety of dimensions and form factors, including, but not limited to, rectangular, other polygonal (e.g., octagonal), circular and elliptical form factors. For example, the light fixture can be square (see FIG. 1) with a size of approximately nine inches by nine inches, approximately twelve inches by twelve inches, or approximately twenty-four inches by twenty-four inches. By way of example, the light fixture 10 also can be rectangular with a size of approximately one foot by four feet (1 foot×4 feet) (see FIG. 2) or a size of approximately two feet by four feet (2 feet×4 feet) (see FIG. 3), corresponding to exemplary lower dimensions of standard fluorescent ceiling troffers. In another embodiment, the light fixture 10 can be sized to standard lengths for under counter or under cabinet lighting applications (e.g., twelve inches, eighteen inches, twenty-four inches, thirty-six inches, etc.). The LED panel can take on any lateral size, while maintaining a relatively small thickness, without departing from the scope of the disclosed technology. This versatility in sizing provides enhanced flexibility in use in connection with a variety of applications.

As noted above, in accordance with one exemplary embodiment, the light fixture 10 can include a frame 14, a substantially flat LED panel 12 disposed within the frame 14 and power circuitry 16 disposed or otherwise housed within the frame 14. The power circuitry 16 is configured to electrically couple the LED panel 12 to an external power supply (not shown), for example, via a suitable electrical connector such as a plug or socket connector 18. It will be appreciated that the LED panel fixture can be configured to provide bright, uniform light in a relatively thin package. For example, in accordance with one embodiment, the substantially flat LED panel 12 can have a thickness of less than about 1.0 inches. In accordance with another embodiment, the substantially flat LED panel 12 can have a thickness of less than about 0.5 inches. In accordance with one exemplary embodiment, the frame 14 can be made up of four segments having mitered joints. Alternatively, the frame 14 can be formed from two pieces (e.g., a top piece and a bottom piece) snapped or otherwise joined together. The frame can define or otherwise include stand-offs on the back of the frame (e.g., for providing ventilation when the frame is surface mounted to a support surface).

Figure 8:
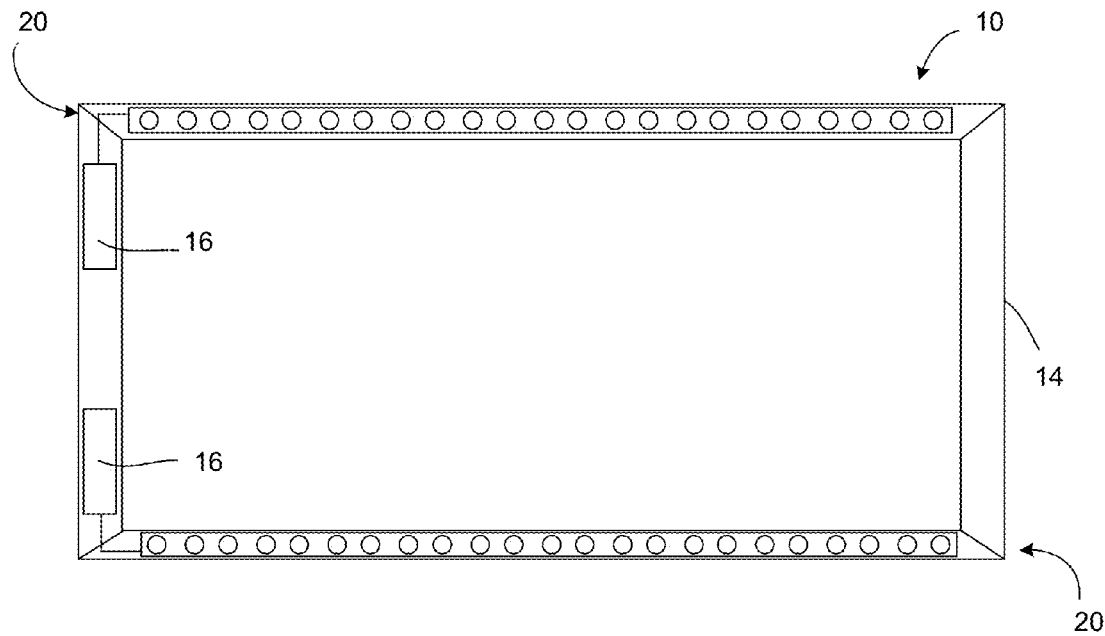
FIG. 8 is a diagrammatic illustration of a substantially flat LED panel in accordance with one aspect of the disclosed technology.
Figure 9:
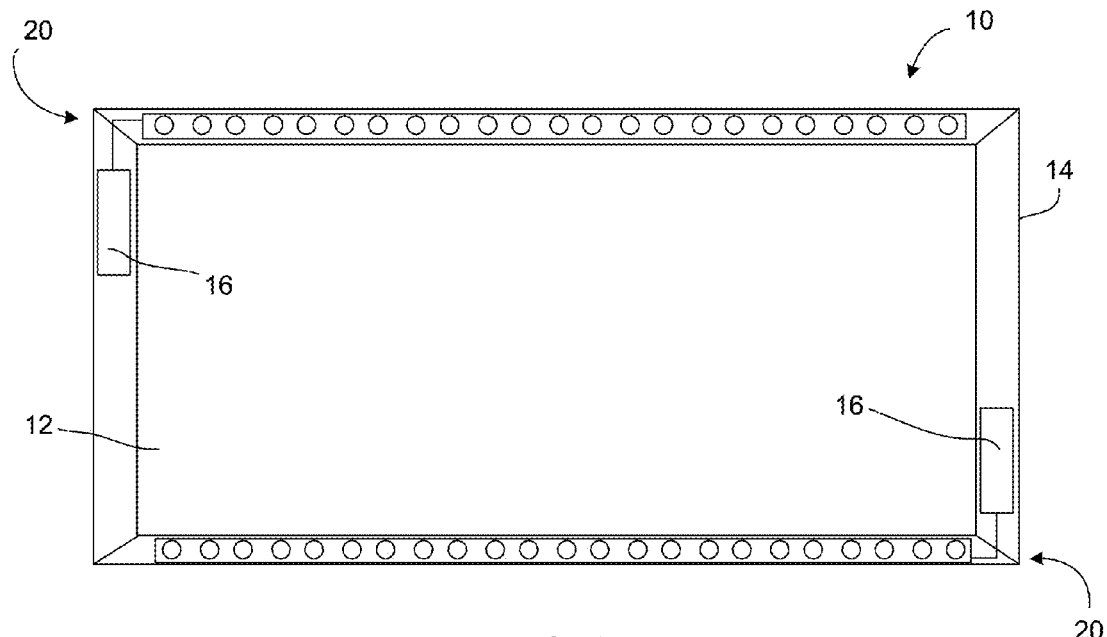
FIG. 9 is a diagrammatic illustration of a substantially flat LED panel in accordance with one aspect of the disclosed technology.
Figure 10:
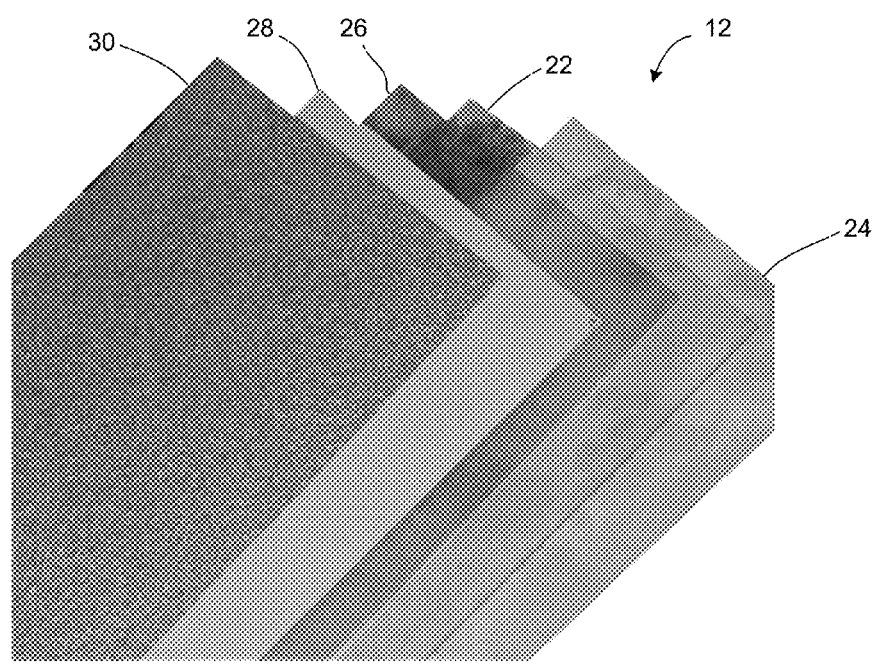
FIG. 10 is shows an exploded view of an optical stack of a LED panel in accordance with one aspect of the disclosed technology.
Figure 11:
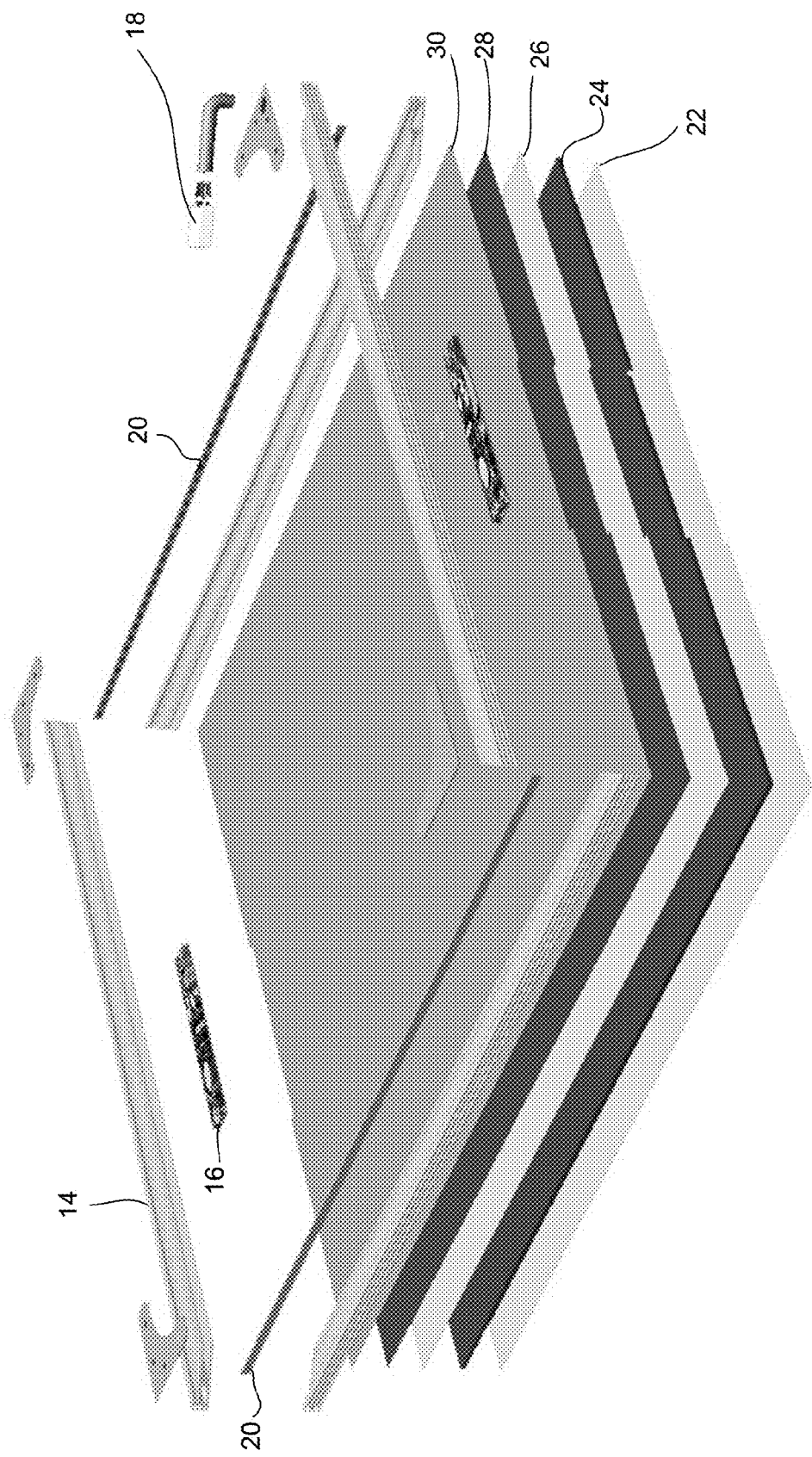
FIG. 11 is shows an exploded view of an optical stack of a LED panel in accordance with one aspect of the disclosed technology.
Figure 12:
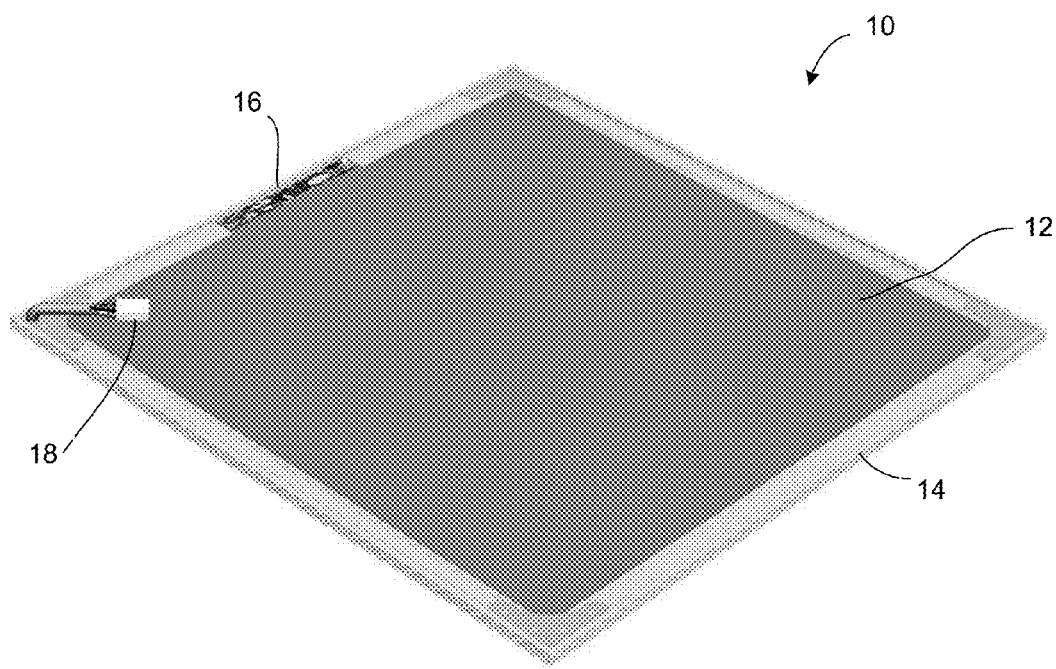
FIG. 12 is a rear perspective view of a LED panel in accordance with one aspect of the disclosed technology.
Figure 13:
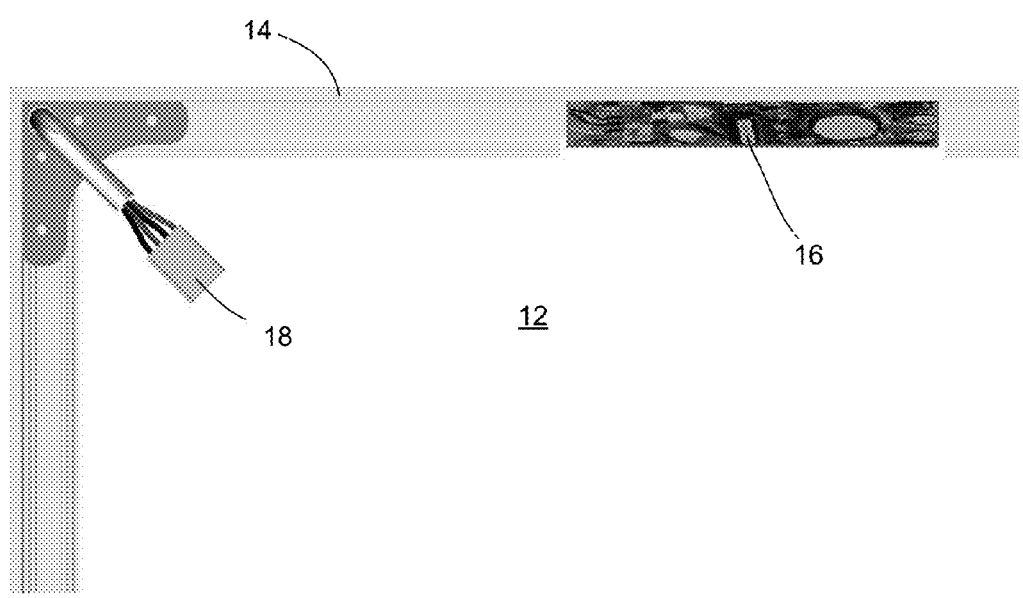
FIG. 13 is a rear view of a portion of a LED panel in accordance with one aspect of the disclosed technology.

Referring now to FIGS. 10-11, and with continued reference to FIGS. 1-9, exemplary embodiments, in which the LED panel includes a plurality of layers along with edge lighting disposed adjacent to at least one edge of the frame, are provided. In the illustrated exemplary embodiments, the LED panel includes an optically-transmissive panel 22, e.g., a light guide plate or other polycarbonate or acrylic plate configured to produce even distribution of light received at edges of the optically-transmissive panel 22. An array of LEDs (designated generally as 20) can be disposed adjacent at least one edge of the frame 14 and the optically transmissive panel 22. For example, a strip of LEDs 20 may be supported adjacent to one edge of the frame 14 (e.g., disposed within a channel in the frame) and adjacent to one edge of the optically-transmissive panel 22. Alternatively, the LED panel 12 can include strips, arrays or configurations of LEDs 20 incorporated into or at least partially supported by two edges of the frame 14. (References in this disclosure to LEDs 20 being supported by, incorporated into or adjacent an edge of the frame includes the LEDs being supported by a wall of a channel located at the edge of the frame, wherein the channel wall is offset from the edge of the frame by the width of the channel).

The strips, arrays or configurations of LEDs can be mounted to the frame using one of a number of suitable methods. For example, the LED strips or arrays 20 can be secured to a portion of the frame (e.g., within a channel in the frame) using a suitable adhesive or suitable fasteners. It will be appreciated that the LED strips or arrays 20 can be mounted to the frame in a way that controls the dissipation of heat from the LED strips or arrays to the frame. For example, it can be desirable to use the frame to dissipate some heat from LED arrays 20, while limiting the amount of heat passing to the frame to prevent the frame from becoming too warm. In accordance with one exemplary embodiment, a suitable adhesive can be used to allow a limited amount of heat transfer from the LED arrays 20 to the frame 14. Alternatively, metal fasteners (or direct contact with the frame) can be used to facilitate a greater degree of heat transfer from the LED arrays to the frame.

In yet another exemplary embodiment in which the light fixture 10 has a rectangular form factor, the LED panel 12 can include strips, arrays or configurations of LEDs 20 incorporated into or at least partially supported by all four edges of the frame 14. The LEDs can be sized and positioned such that the "emission dimension" of the LED elements has the same thickness or slightly less thickness than the thickness of the light input edge of the optically-transmissive panel, thereby allowing for an extremely thin profile. Not shown in the drawings, the LEDs may include optical coupling structures such as lenses or reflectors that direct light emitted by the LEDs into an edge of optically-transmissive panel 22.

The LED panel 12 can include a diffuser film 24 disposed on a first side of the optically-transmissive panel 22, e.g., below the optically transmissive panel 22 when the fixture is mounted horizontally for a ceiling lighting application. The outer diffuser film 24 is configured to provide uniform light output, and can be made of any suitable material. For example, for outdoor applications, the outer diffuser film 24 can be a weatherable film. The outer diffuser film 24 can be configured as a soft film or as a hard, abrasion-resistant film depending upon the particular application. The outer diffuser film 24 can be made waterproof or moisture proof depending upon the desired application.

The LED panel 12 can include a brightness enhancement film (BEF) 26 disposed on a second side of the optically-transmissive panel 22, e.g., above the optically-transmissive panel 22 when the fixture is mounted horizontally for a ceiling lighting application. The brightness enhancement film 26 can be configured to collimate light along a vertical axis to improve the overall light output from the LED panel 12. In accordance with one embodiment, the LED panel can be configured to include multiple BEFs optimized for the particular arrangement of LEDs along one or more edges of the LED panel. In this exemplary embodiment, the LED panel can include an optically-transmissive panel in the form of a light guide plate with a first array of LEDs incorporated into a first side of the frame adjacent a first side of the light guide plate, the first array of LEDs emitting light focused along a first direction, and a second array of LEDs incorporated into a second side of the frame adjacent a second side of the light guide plate, the second array of LEDs emitting light focused along a second direction that is opposite the first direction. The substantially flat LED panel can include a first brightness enhancement film (BEF) positioned adjacent the light guide plate and configured to collimate light emitted by the first array of LEDs, and a second BEF positioned adjacent the first BEF and configured to collimate light emitted by the second array of LEDs.

The LED panel 12 can include a reflector 28 positioned on the other side of the BEF 26 (e.g., above the BEF 26) when the fixture is mounted horizontally (e.g., for a ceiling lighting application). The reflector 28 is configured and position to return a portion of the light emitted by the optically-transmissive panel 22 in a direction opposite the intended output direction, thereby providing enhanced total light output. In the illustrated exemplary embodiments, the substantially flat LED panel 12 includes a backing 30, e.g., a sheet metal backing disposed adjacent the other side of the reflector 28. A sheet metal backing 30 in combination with a metallic (e.g., aluminum) frame 14 can provide excellent dissipation of heat generated by the LEDs.

While aspects of the disclosed technology have been described with respect to LED strips or arrays disposed adjacent to edges of the frame and the optically-transmissive panel, it will be appreciated that other configurations may be employed without departing from the scope of the present invention. For example, FIG. 9B shows an embodiment in which an array of LEDs (e.g., a full array of LEDs) is disposed across most or substantially all of the area of an optically-transmissive panel, while receiving power from edge-mounted power circuitry within the frame of the flat panel lighting fixture. For example, the panel can incorporate rows of LEDs at one face of the optically-transmissive panel, wherein the LEDs in each row are electrically coupled by a power line to a driver located at the edge of the LED fixture.

Figure 7:
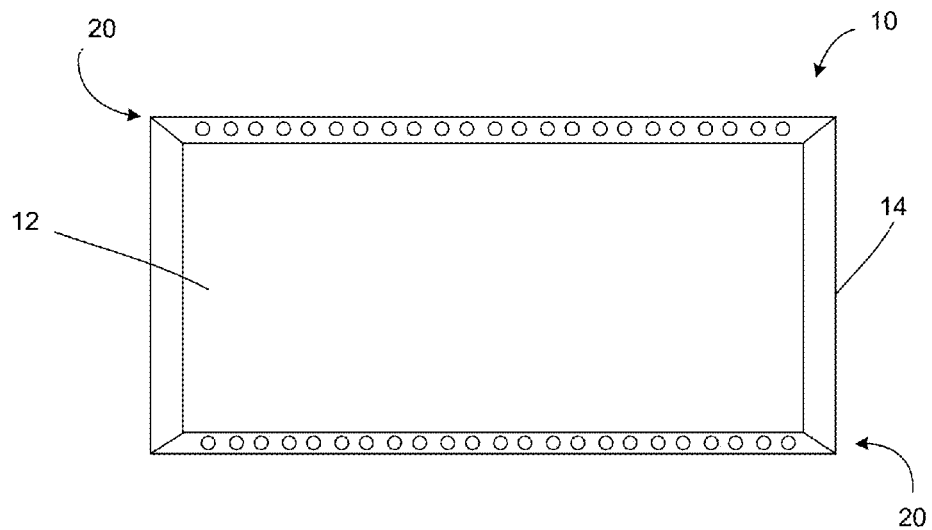
FIG. 7 is a diagrammatic illustration of a substantially flat LED panel in accordance with one aspect of the disclosed technology.
Figure 9A:
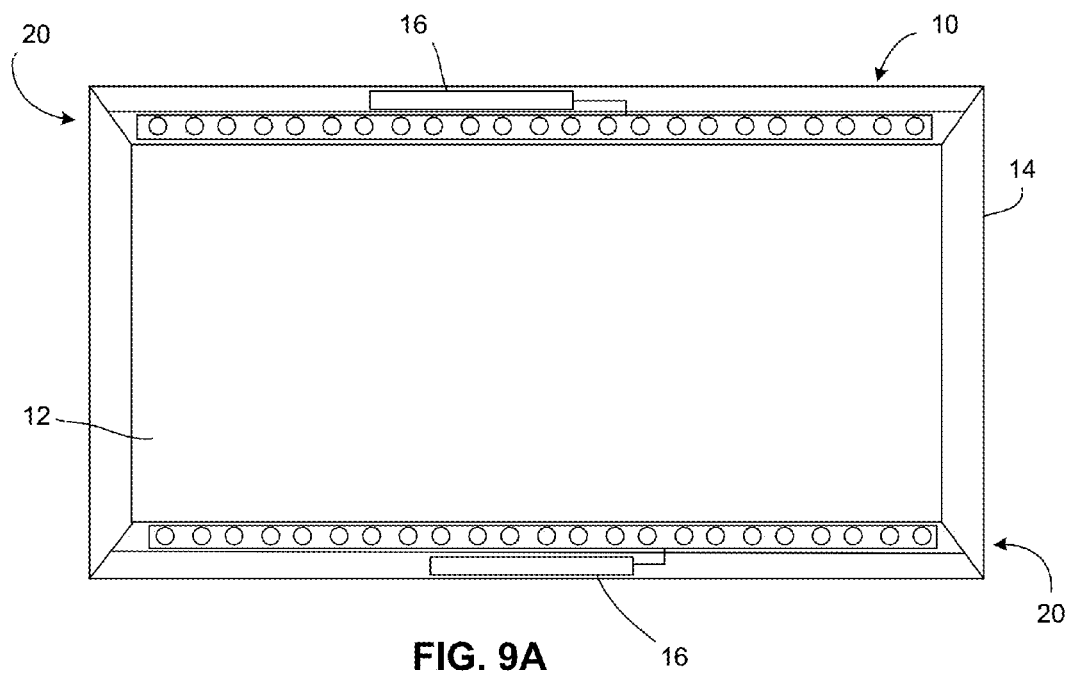
FIG. 9A is a diagrammatic illustration of a substantially flat LED panel in accordance with one aspect of the disclosed technology.
Figure 9B:
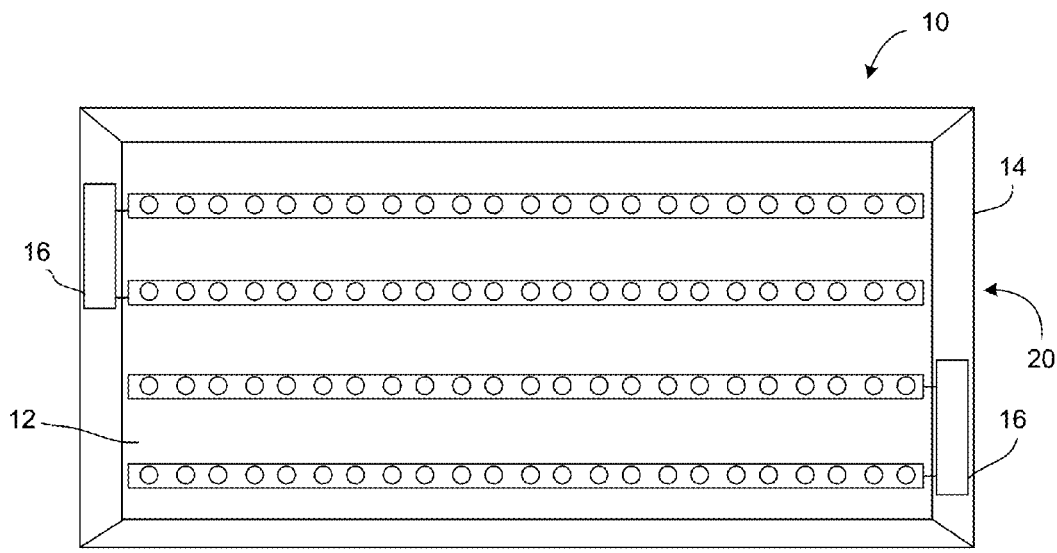
FIG. 9B is a diagrammatic illustration of a substantially flat LED panel in accordance with one aspect of the disclosed technology.

With continued reference to FIGS. 1-9B, and turning now to FIGS. 12-23, in accordance with one exemplary embodiment, the light fixture 10 includes power circuitry 16 disposed or otherwise housed within the frame 14, where the power circuitry 16 is configured to electrically couple the LED panel 12 to an external power source (e.g., via a suitable electrical connector 18). It will be appreciated that this embodiment serves to provide an LED panel fixture with an extremely thin form factor that can be easily mounted to a flat surface, such as a wall, an underside of a cabinet or the like. As shown in FIGS. 7-9, the light fixture 10 can be configured to include first and second LED strips, bars, arrays or configurations (designated generally as 20) disposed on opposite sides of the frame 14, along with power circuitry in the form of a pair of LED drivers 16 positioned in one or both of the remaining sides of the rectangular frame. The illustrated embodiment shows a first LED driver 16 electrically coupled to and configured to control a first LED array (e.g., an LED strip 20), along with a second LED driver 16 coupled to and configured to control the second LED array (e.g., an LED strip).

As noted above, the light fixture includes power circuitry 16 disposed within or otherwise housed by the frame, where the power circuitry 16 is configured to electrically couple the LED panel 12 to an external power source. It will be appreciated that the power circuitry will be configured to have a relatively long and narrow form factor, allowing it to be housed within a portion of a frame. FIGS. 14-18 show exemplary embodiments of the power circuitry 16, or portions of the power circuitry disposed or otherwise housed within a portion the frame 14. For example, in accordance with one exemplary embodiment, the power circuitry (or component boards of the power circuitry) can have a length and a width, where the length-to-width ratio is at least 5-to-1. In accordance with another exemplary embodiment, the power circuitry can have a length-to-width ratio of at least 10-to-1.

The frame 14 can be configured to define or otherwise provide one or more channels to support aspects of the power circuitry, the associated wiring as well as LED arrays or bars. For example, a portion of the frame may be configured to define a channel 40 (e.g., a channel designated as a first channel or a second channel) sized to house a portion of the power circuitry 16. For example, in accordance with one embodiment, the first channel 40 within a portion of the frame can be configured to house power circuitry (e.g., LED driver circuitry) having dimensions of approximately twelve inches in length, approximately one inch of width and approximately one half inch in height. It will be appreciated that the disclosed technology is not limited to these exemplary dimensions. The first channel 40 can take on other dimensions without departing from the scope of the disclosed technology.

Such compact power and control circuitry can be obtained by employing miniaturized power and/or control boards. For example, a programmable logic controller (PLC) motherboard can serve as a real-time clock with timing control logic to regulate operation of the LED arrays. As is discussed more fully below, multiple arrays, sets or configurations of LEDs can be operated in an alternating manner according to a predetermined timing sequence. This motherboard may operate in coordination with one or more daughterboards, which are disposed or otherwise housed within the frame (e.g., within a first or second channel defined by a portion of the frame) to provide additional functionality. For example, a sensor module can process signals from one or more sensors within the light fixture (e.g., a sensor to determine the intensity and/or color temperature of light being emitted by the light fixture) (see, for example, FIGS. 22-23). Output from these sensors can be used, for example, to control the output intensity of the lighting fixture in the case of lumen depreciation for some or all of the LEDs within the lighting fixture.

Figure 14:
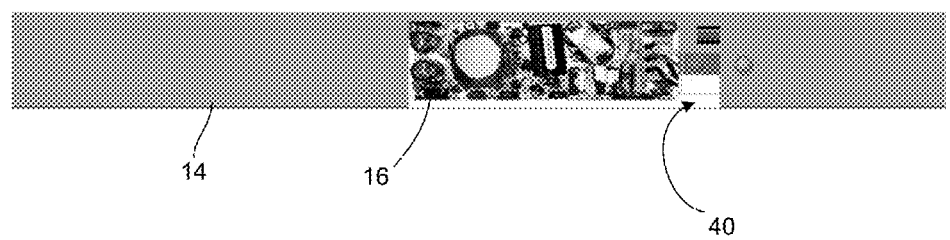
FIG. 14 is a diagrammatic illustration of a portion of a frame housing power circuitry in accordance with one aspect of the disclosed technology.
Figure 14A:
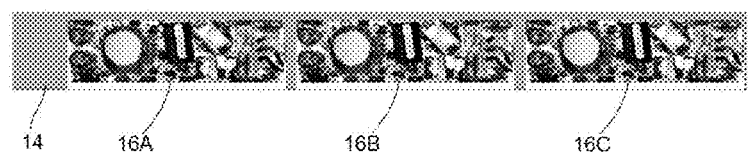
FIG. 14A is a diagrammatic illustration of a portion of a frame housing power circuitry in accordance with one aspect of the disclosed technology.
Figure 15:
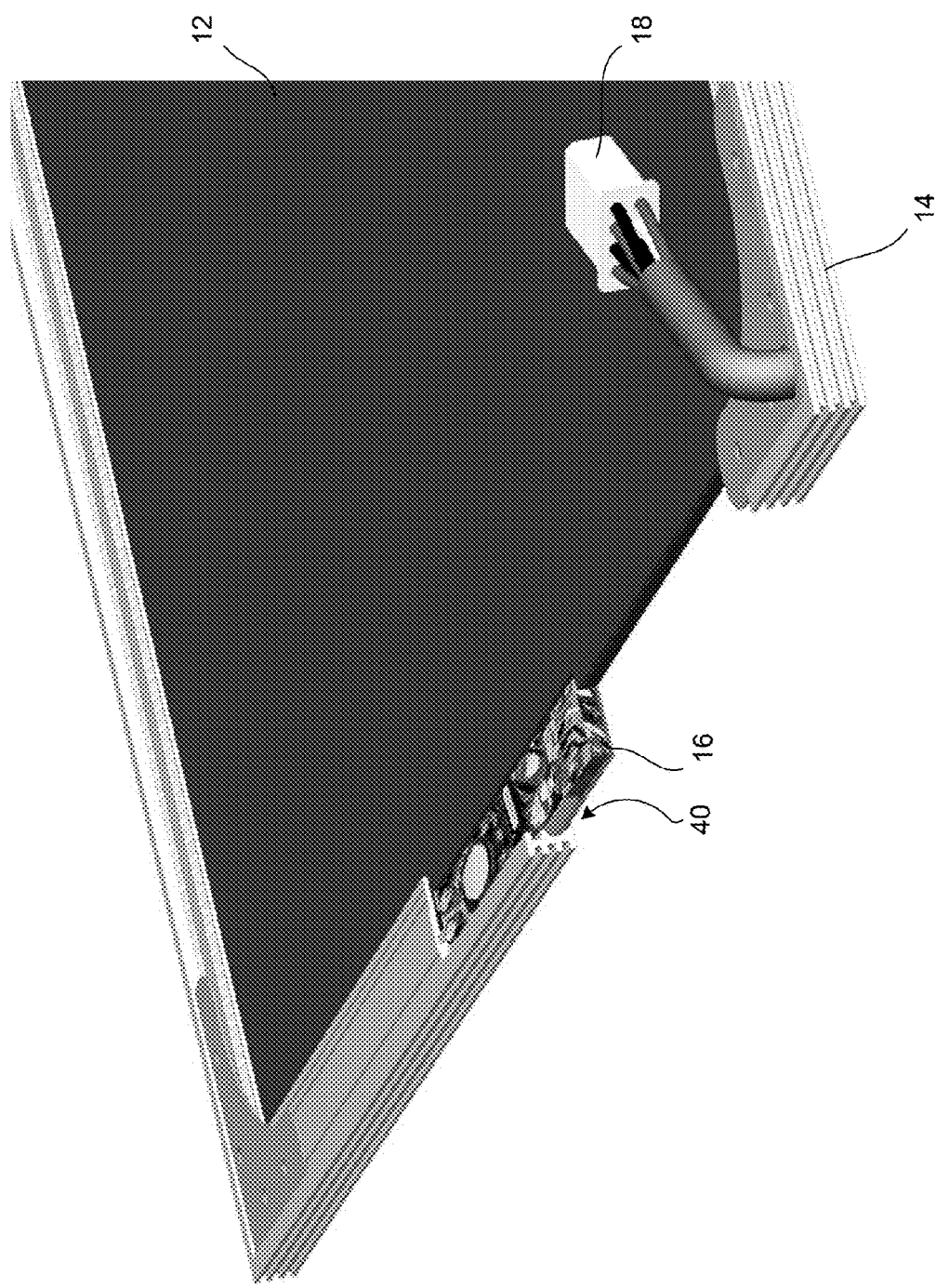
FIG. 15 is a rear view of a portion of a LED panel in accordance with one aspect of the disclosed technology.

It will be appreciated that various sensors can be employed without departing from the scope of the disclosed technology. For example, infrared sensors may be used for remote control dimming. Also, ambient light sensors may be employed to provide automatic adjustment to dimming. It also will be appreciated that the light fixture can be configured to receive external inputs to control operation, such as signals from an associated security camera or motion sensor system Multiple control modules may be distributed within the frame for efficient use of space. For example, two primary drivers may be disposed or otherwise housed at opposite edges of the frame and one or more input/output modules can be housed at a transverse edge of the frame. As shown in FIG. 14A, the use of miniaturized circuit elements permits multiple power supply or control modules to be arrayed within a given channel 40 of the frame 14. Three power supply modules 16A, 16B, and 16C are arrayed within the channel. As shown these are separate circuit elements, but multiple power supply or control modules also can be integrated on a single circuit board. Respective power supply circuits can be electrically coupled to different sets of LEDs within an array of LEDs (not shown in FIG. 14A). This arrangement permits the DC voltage and current output specifications of each power supply circuit to be matched to input requirements of a subset of the LEDs within the LED array, while making efficient use of limited space within frame 14. Further, this arrangement can facilitate underdriving an array of LEDs to allow for increased driving in the case of lumen depreciation.

Figure 16:
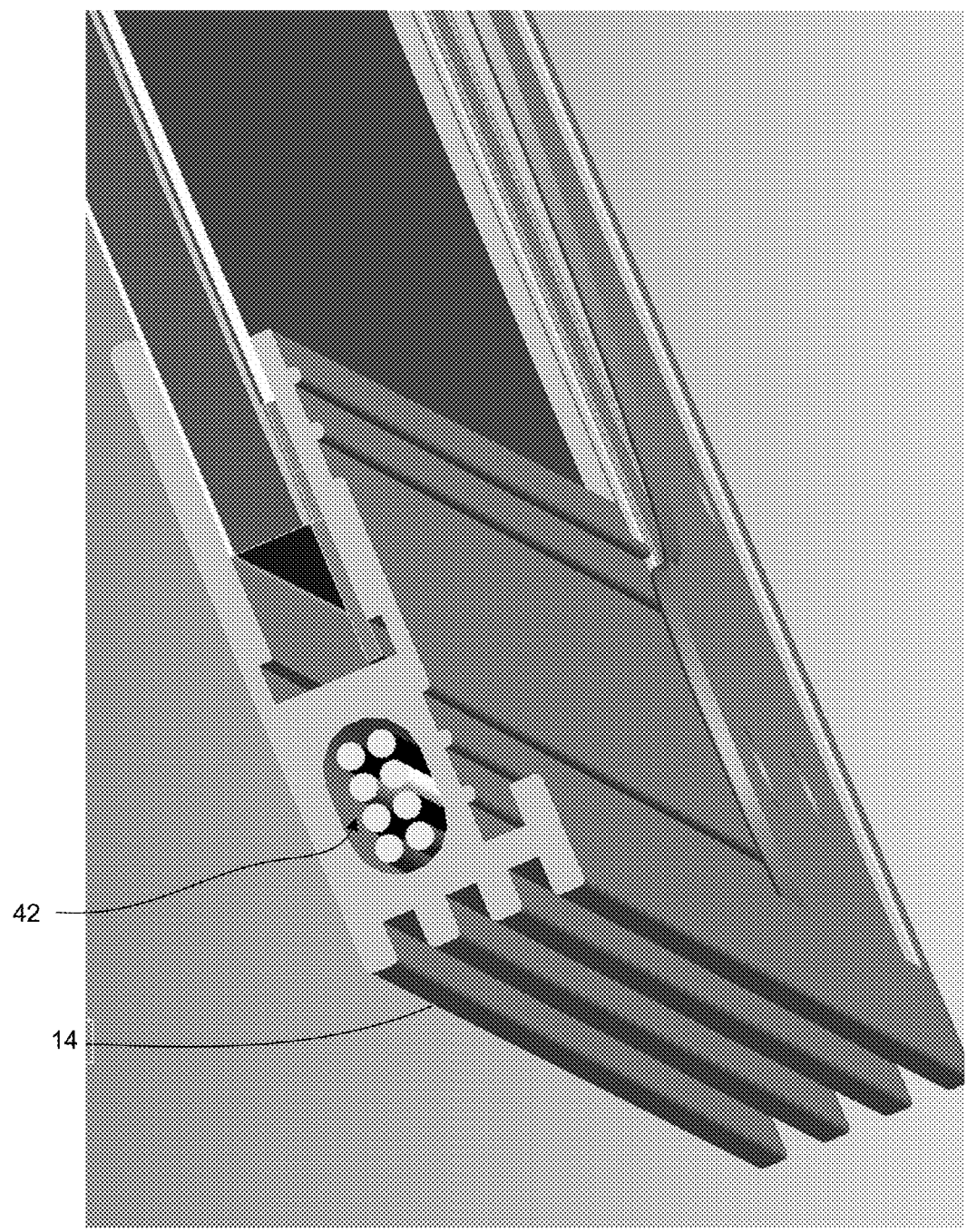
FIG. 16 is a diagrammatic illustration of a portion of a frame in accordance with one aspect of the disclosed technology.
Figure 17:
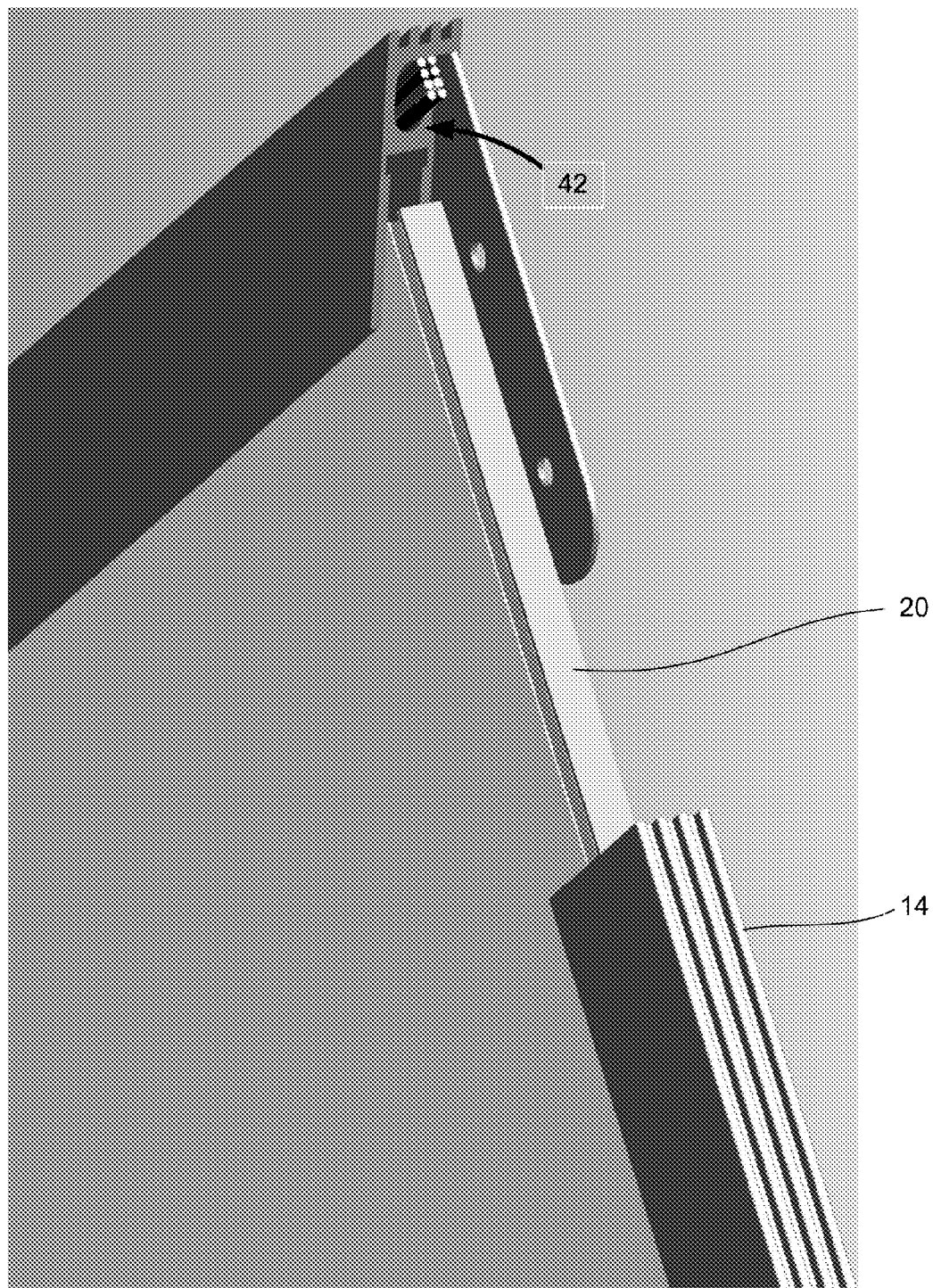
FIG. 17 is a perspective view of a portion of a LED panel in accordance with one aspect of the disclosed technology.
Figure 18:
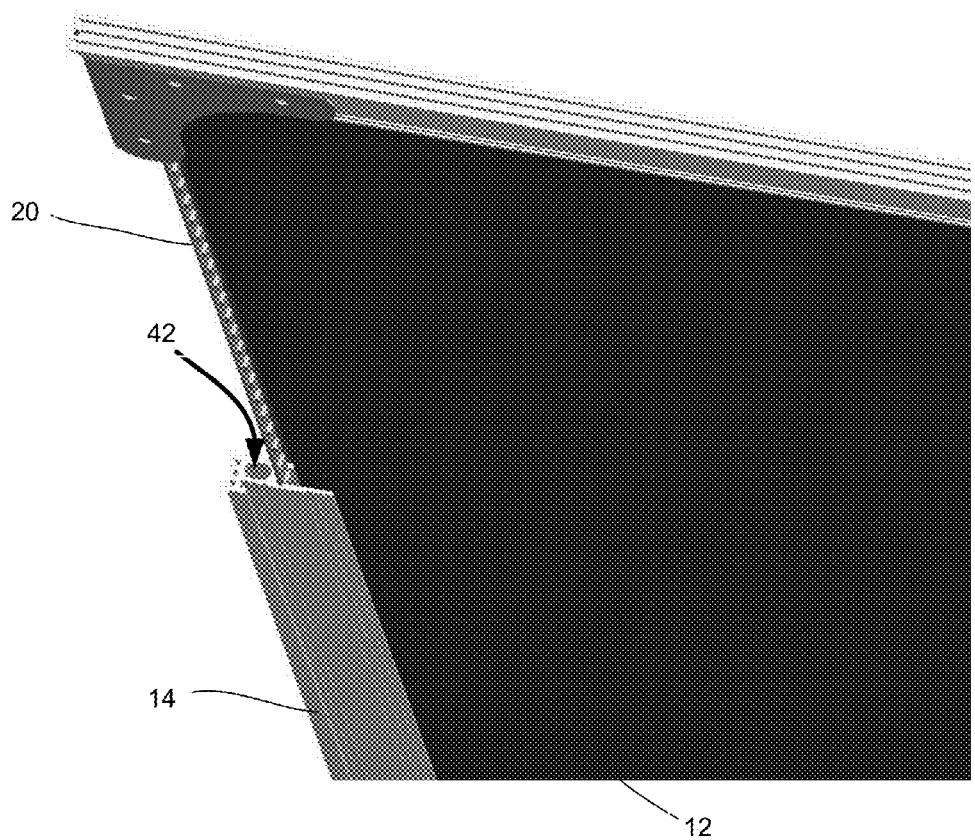
FIG. 18 is a perspective view of a portion of a LED panel in accordance with one aspect of the disclosed technology.
Figure 19:
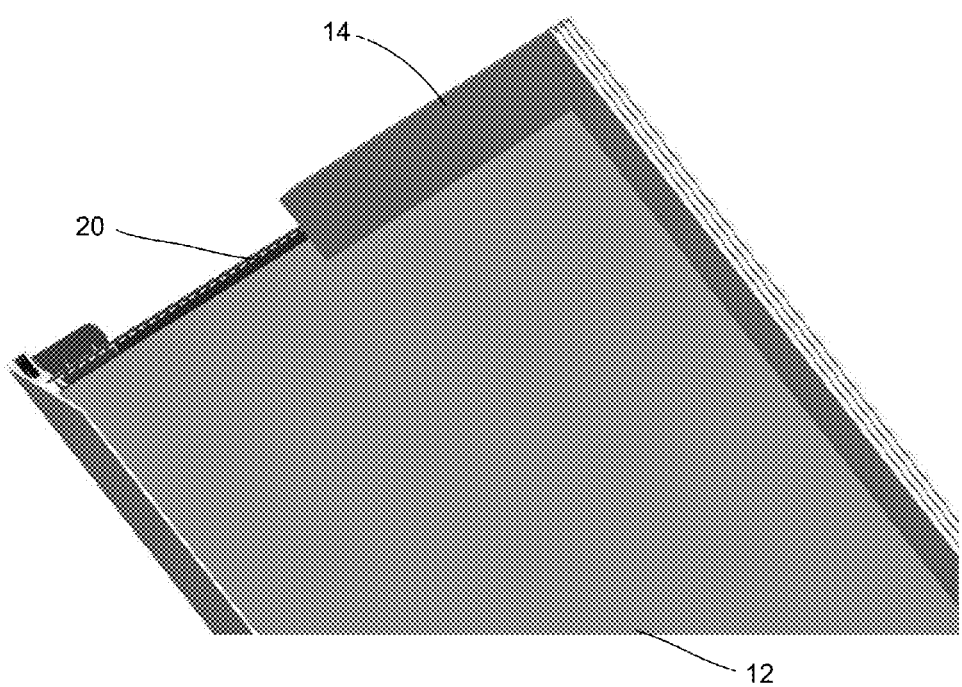
FIG. 19 is a perspective view of a portion of a LED panel in accordance with one aspect of the disclosed technology.
Figure 20:
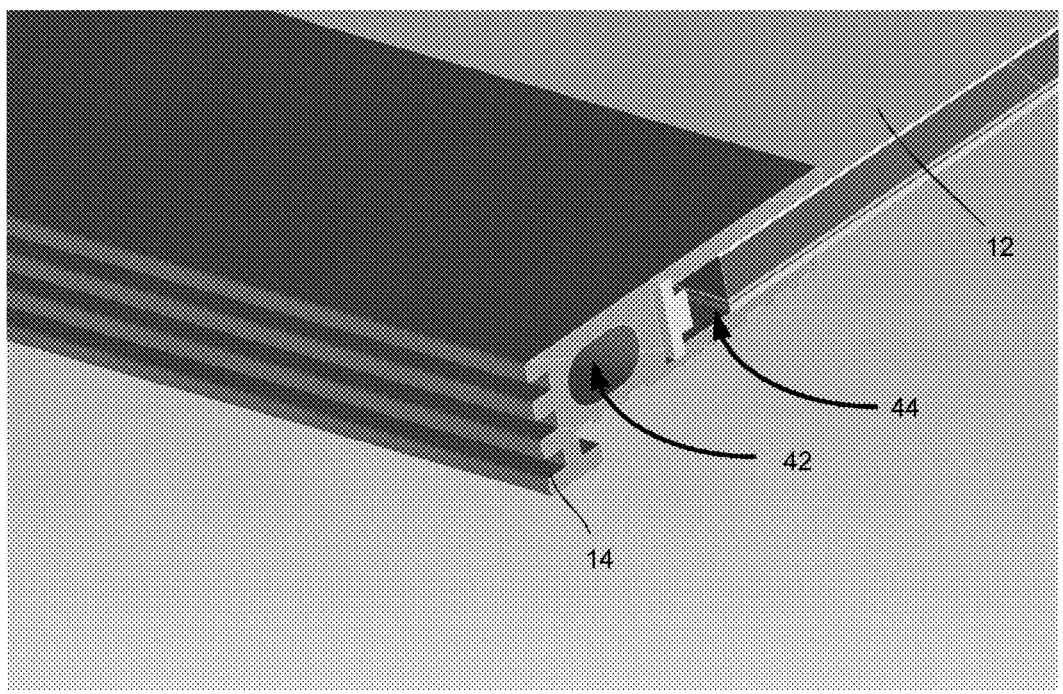
FIG. 20 is a perspective view of a portion of a frame in accordance with one aspect of the disclosed technology.
Figure 21:
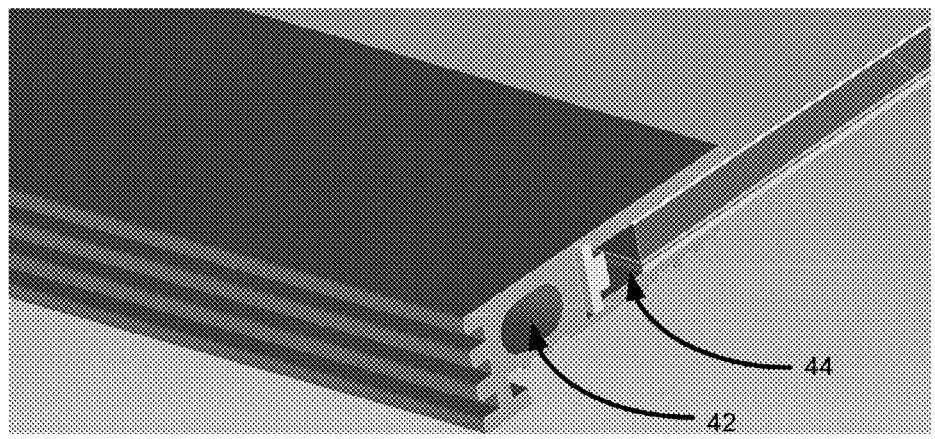
FIG. 21 is a perspective view of a portion of a frame in accordance with one aspect of the disclosed technology.
Figure 22:
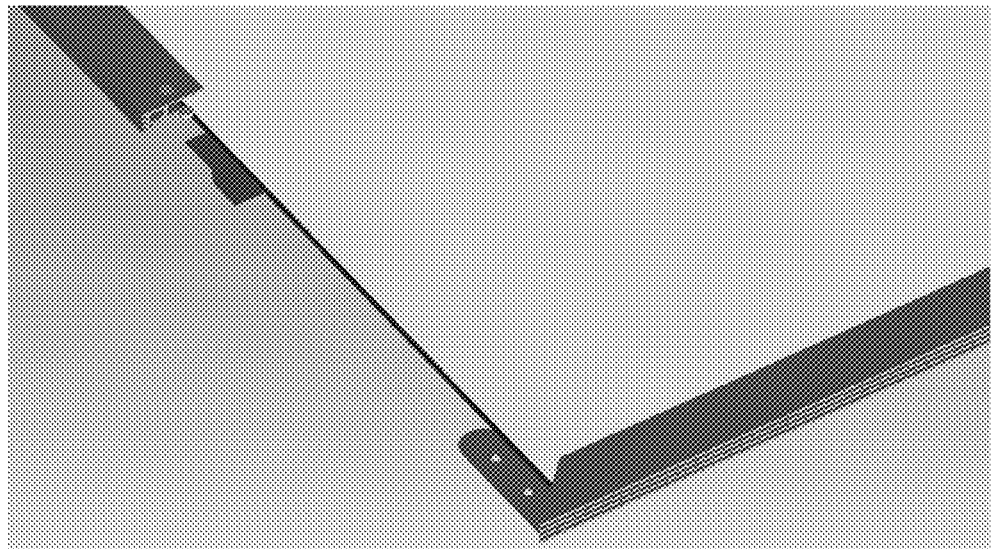
FIG. 22 is a perspective view of a portion of a LED panel in accordance with one aspect of the disclosed technology.
Figure 23:
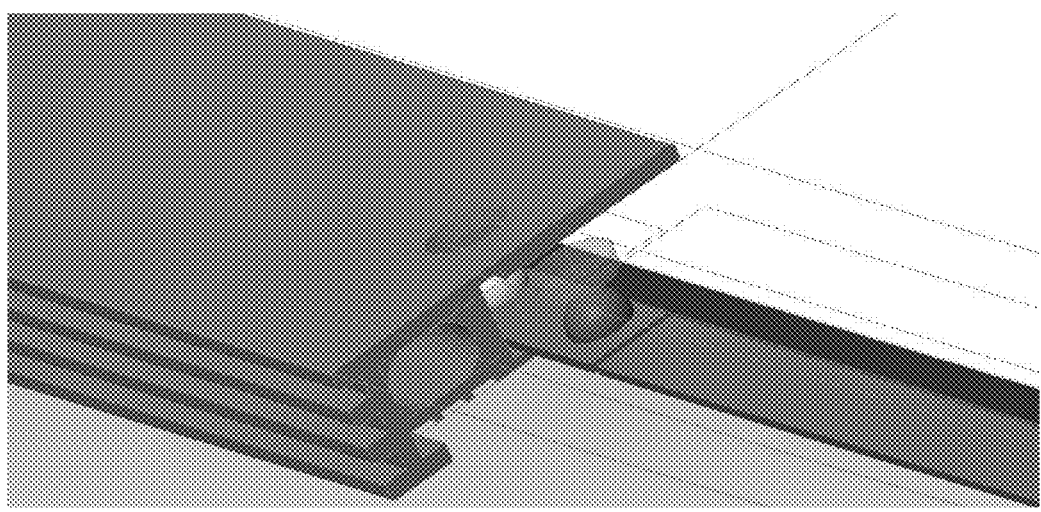
FIG. 23 is a perspective view of a portion of a LED panel in accordance with one aspect of the disclosed technology.
Figure 24:
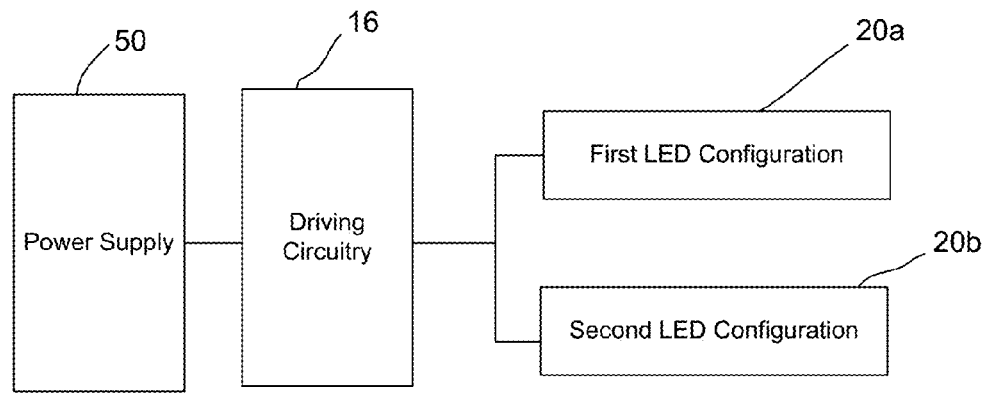
FIG. 24 is a diagrammatic illustration of the light fixture in accordance with one aspect of the disclosed technology.
Figure 25:
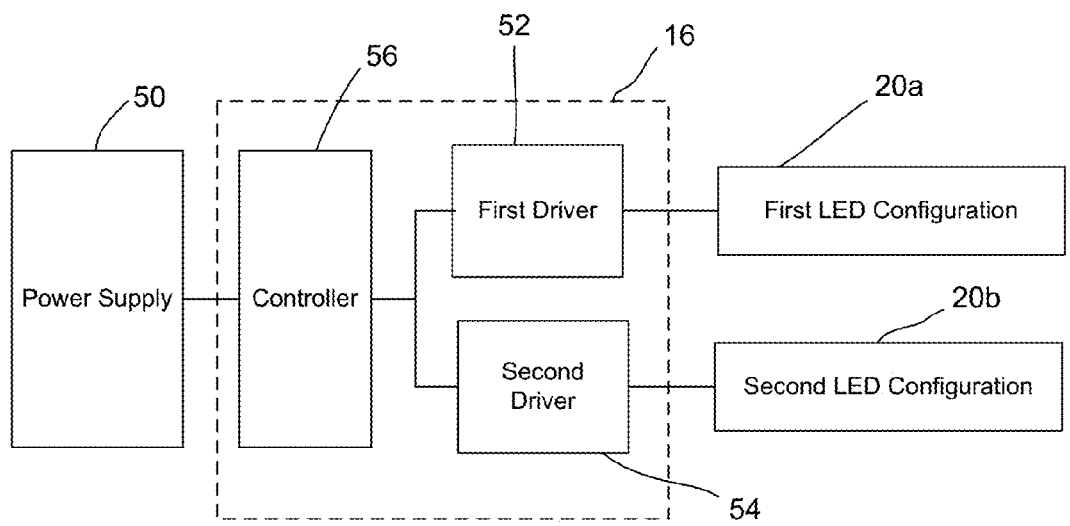
FIG. 25 is a diagrammatic illustration of the light fixture in accordance with one aspect of the disclosed technology.
Figure 26:
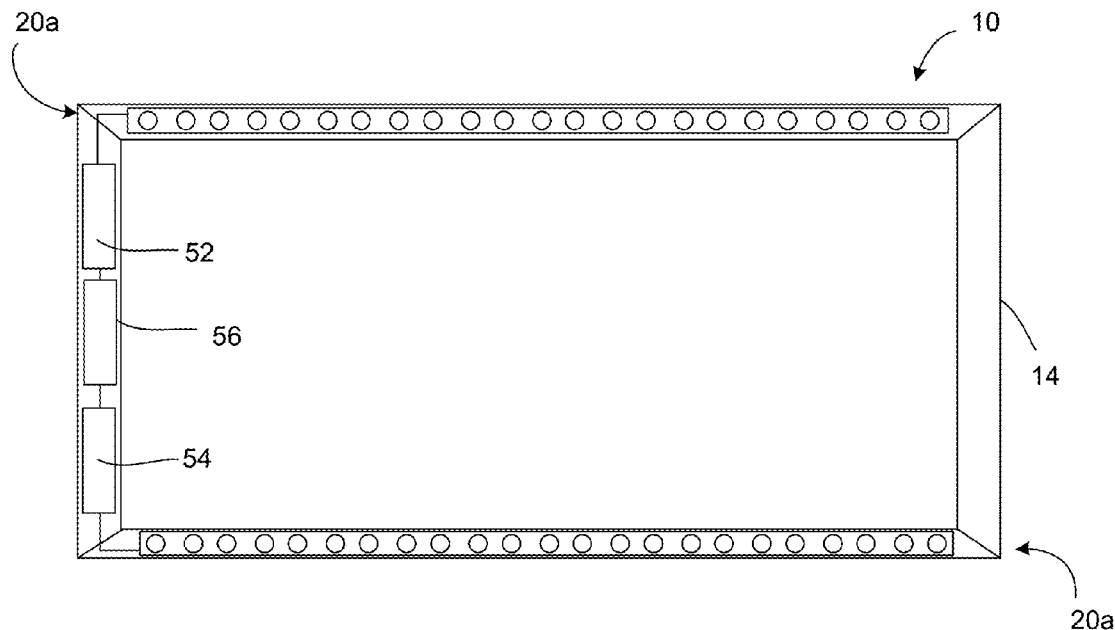
FIG. 26 is a diagrammatic illustration of the light fixture in accordance with one aspect of the disclosed technology.

In accordance with one exemplary embodiment, the frame or a portion of the frame 14 can be configured to define another channel 42 (e.g., a channel designated as a first channel or a secondary channel) for housing wiring or other electrical connectors associated with the light fixture. For example, as shown in FIGS. 16-17, portions of the frame can include a channel 42 to support a number of wires connecting the LED arrays to the driving circuitry. It will be appreciated that given the potentially limited cross-sectional dimensions of the channel in certain portions of the frame or all of the frame, it might be undesirable to route wiring or cables alongside circuit boards associated with the power circuitry. In this situation, a channel can be defined to house embedded conductive traces to conserve space within the frame. In this exemplary embodiment, cables or other conventional wiring can be used at other locations around the frame, such as interconnecting an LED bar and driving circuitry at a corner of the frame or at another area in the frame where power circuitry or driver circuitry is not present.

It will be appreciated that the driving circuitry can be tailored or otherwise customized to support the relatively long, but narrow, geometry of the driving circuitry. For example, space-sensitive components, such as capacitors and the like, can be oriented along the long direction of the power circuitry footprint. In addition, printed circuit boards associated with the power circuitry can be configured to include multi-layers in which conductive layers and/or conductive traces are stacked between insulating material. In addition as noted above, multiple circuit modules can be arrayed at a given channel or edge area of frame 14.

In accordance with one exemplary embodiment, the frame or a portion of the frame can be configured to yet another channel 44 (e.g., a channel designated as a third channel) for housing a supporting arrays or strips of LEDs 20.

It will be appreciated that housing the power circuitry within the frame can provide an LED panel fixture with an extremely thin form factor that can be easily mounted to a flat surface, such as a wall, an underside of a cabinet or the like. As discussed above, the light fixture 10 can be configured to include first and second LED strips or bars 20 disposed on opposite sides of the frame 14, along with power circuitry in the form of a pair of LED drivers positioned in one or both of the remaining sides of the rectangular frame. The illustrated exemplary embodiments shows a first LED driver electrically coupled to and configured to control a first LED array along with a second LED driver coupled to and configured to control the second LED array.

FIG. 9 shows an alternative light fixture 10 with the first and second LED arrays disposed on opposite sides of the frame 14 (e.g., on a top side of the frame and a bottom side of the frame in the orientation provided in the figure), and with a pair of LED drivers positioned on both remaining sides of the frame.

In FIG. 8 and FIG. 9, LED strips or bars 20 are located at different sides of the frame 14 than LED drivers 16. As seen in FIG. 9A, it is also possible to locate the LED drivers 16 on the same sides of the frame as the LED strips 20. This arrangement makes less efficient use of the space at the edges of frame 14, but may simplify electrical connection of drivers 16 to LED strips 20.

Turning now to FIGS. 24-35, another aspect of the disclosed technology will be described in greater detail. In accordance with one exemplary embodiment, the light fixture can include multiple sets or configurations of LEDs. For example, the light fixture can be configured to include a first set or configuration of LEDs 20a and a second set or configuration of LEDs 20b along with power circuitry (also referred to as driving circuitry) 16 operatively coupled to the first set of LEDs 20a and the second set of LEDs 20b and an associated power supply (designated generally as 50), for example, a standard AC power supply found in a home or office setting, wherein the driving circuitry 16 is configured to selectively power the first set of LEDs 20a and the second set of LEDs 20b in an alternating manner.

Figure 27:
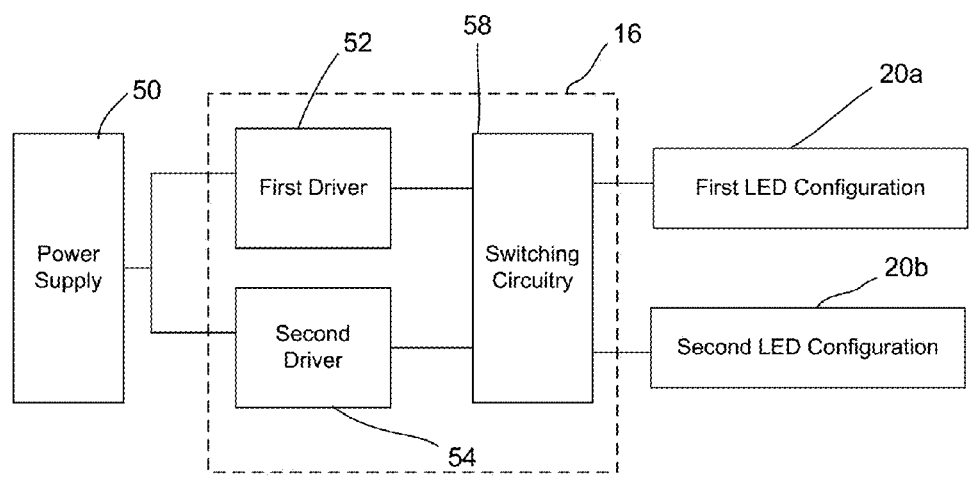
FIG. 27 is a diagrammatic illustration of the light fixture in accordance with one aspect of the disclosed technology.
Figure 28:
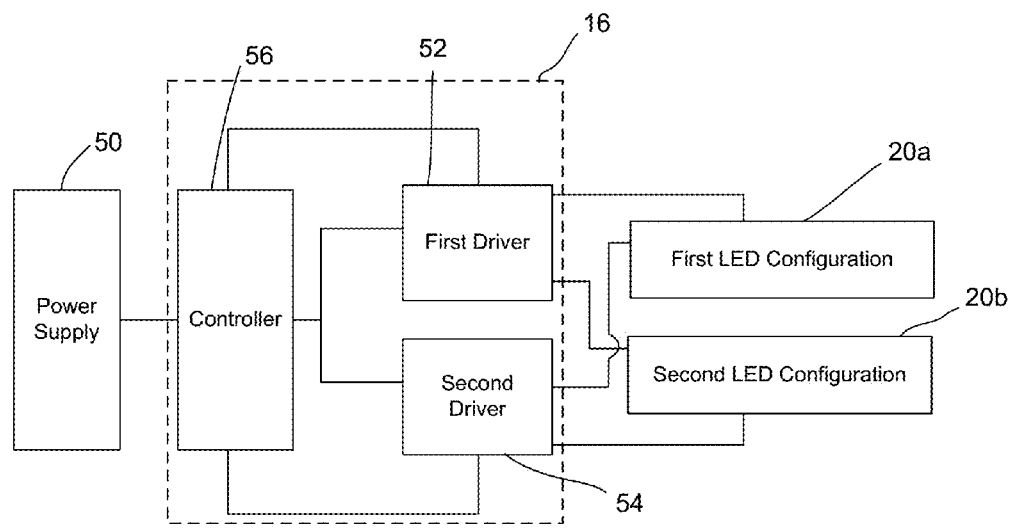
FIG. 28 is a diagrammatic illustration of the light fixture in accordance with one aspect of the disclosed technology.

In accordance with one embodiment (see FIGS. 25-26, and also FIG. 34), the power circuitry 16 can include a first driver 52 operatively coupled to the first LED configuration 20a and a second driver 54 operatively coupled to the second LED configuration 20b. The power circuitry 16 can include a controller 56 operatively coupled to the first driver 52 and the second driver 54, and configured to selectively operate the first driver 52 and the second driver 54 to control the first configuration of LEDs 20a and the second configuration of LEDs 20b in a desired manner. FIG. 27 shows another exemplary embodiment in which switching circuitry 58 is operatively coupled to the first driver 52 and the second driver 54, and configured to selectively activate the first configuration of LEDs 20a and the second configuration of LEDs 20b. FIG. 28 shows yet another exemplary embodiment in which the controller 56 is operatively coupled to the first driver 52 and the second driver 54 to selectively control operation of the first driver 52 and the second driver 54, as well as monitor the first driver 52 and the second driver 54 to ensure that the respective drivers are functioning properly. This embodiment will be discussed in greater detail below.

In accordance with one embodiment, the first set or configuration of LEDs 20a and the second set or configuration of LEDs 20b are driven alternately. For example, while the first configuration of LEDs 20a is active, the second configuration of LEDs 20b can be set to inactive and vice versa. In a preferred embodiment, the first and second configurations of LEDs can be driven cyclically, for example, repeated over periods of time where the "on" cycle time for the first set of LEDs is identical or substantially identical to the "on" cycle time for the second set of LEDs. It will be appreciated that permitting the LEDs adequate time to cool can extend the operating life of the LEDs, thereby potentially extending the operating life of the light fixture. It also will be appreciated that various timing cycles can be implemented within the scope of the disclosed technology. For example, in accordance with one exemplary embodiment, the first set of LEDs 20a can be on for a twenty-four hour period and off for the next twenty-four hour period, where the second set of LEDs 20b is on.

It will be appreciated that the first and second configurations of LEDs can be implemented in a number of ways without departing from the scope of the disclosed technology.

Figure 29:
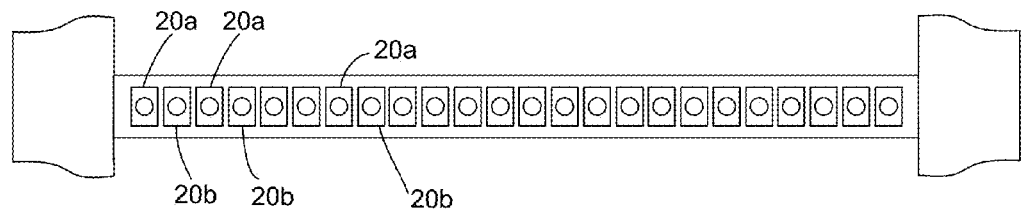
FIG. 29 is a diagrammatic illustration of a LED assembly in accordance with one aspect of the disclosed technology.

For example, as shown in FIG. 29, the first configuration of LEDs 20a and the second configuration of LEDs 20b can be arranged in a single strip or bar in which a single row of LED elements are arrayed in an alternating arrangement (e.g., A B A B arrangement, where A corresponds to an LED within the first LED configuration 20a and B corresponds to an LED within the second LED configuration 20b).

Figure 30:
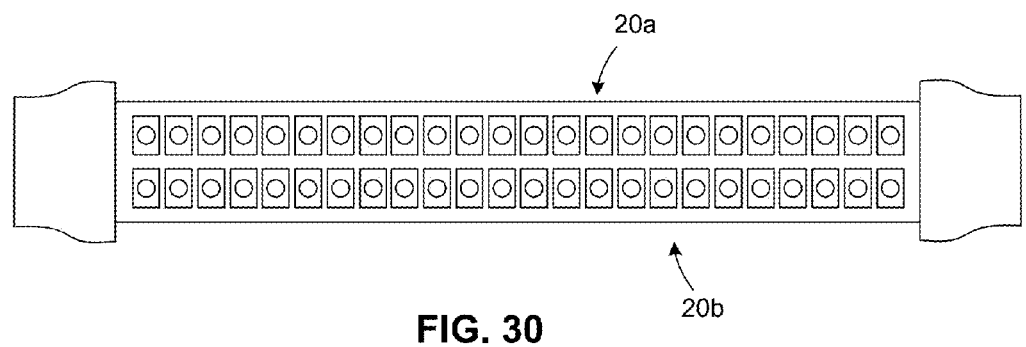
FIG. 30 is a diagrammatic illustration of a LED assembly in accordance with one aspect of the disclosed technology.
Figure 31:
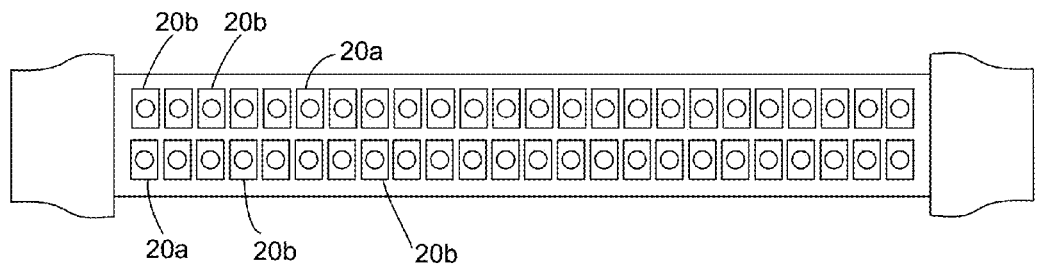
FIG. 31 is a diagrammatic illustration of a LED assembly in accordance with one aspect of the disclosed technology.

Alternatively, as shown in FIG. 30, the LEDs may be disposed in or otherwise arranged in a two-strip bar in which the first configuration of LEDs 20a is included along the top row and the second configuration of LEDs 20b is included along the bottom row. In yet another embodiment, as shown in FIG. 31, the LEDs can be arranged in a two-strip or two-row formation such that the first strip includes alternating arrangements of LEDs from the first configuration of LEDs 20a and the second configuration of LEDs 20b, and the second row of LEDs includes alternating arrangements from the first configuration of LEDs 20a and the second configuration of LEDs 20b. It will be appreciated that in these two-row arrangements, the traditional two-wire power supply for a single row of LEDs operated together would be replaced by at least a four-wire power supply.

Figure 32:
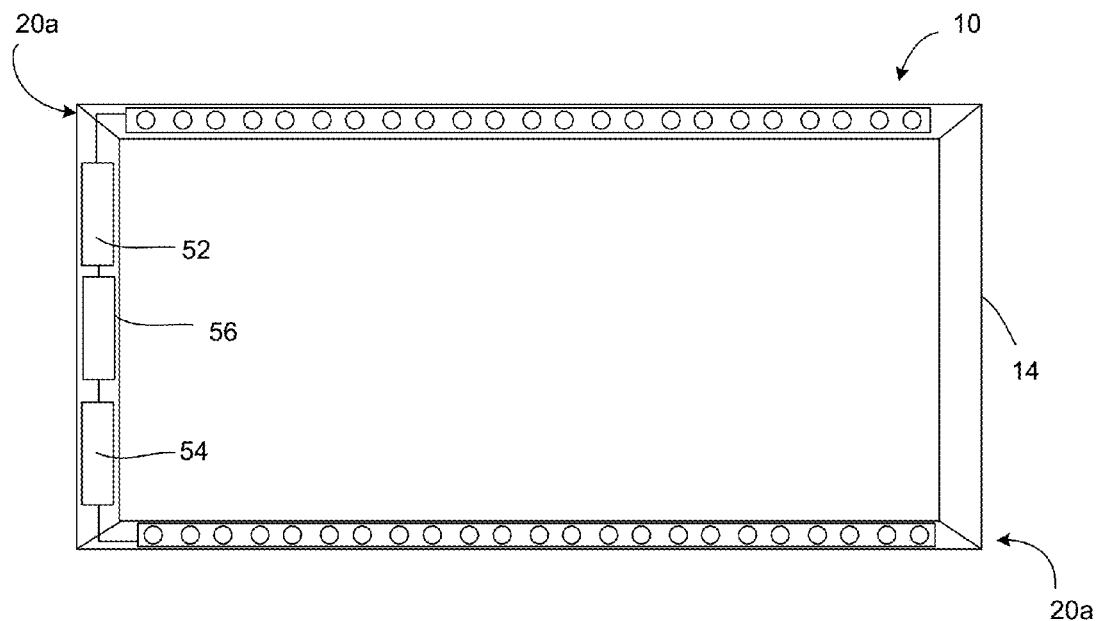
FIG. 32 is a diagrammatic illustration of the light fixture in accordance with one aspect of the disclosed technology.

In yet another exemplary embodiment, as shown in FIG. 32, the light fixture can be configured to have a first row of LEDs disposed on one side of the frame and a second set of LEDs disposed on an opposite side of the frame where the first set of LEDs and the second set of LEDs are driven alternately according to a predetermined time cycle. In yet another alternative embodiment, the first set of LEDs 20a can include a row or array of LEDs on one side of the frame and another row or array of LEDs on the opposite side of the frame. In this embodiment, the second set of LEDs can be configured to include a first row of LEDs on one side of the frame disposed between the two sides used for the first set. In yet another exemplary embodiment, the light fixture can include a first array of LEDs having alternating LEDs from the first set and the second set, with a mirror image configuration on the opposite side of the frame.

Figure 33:
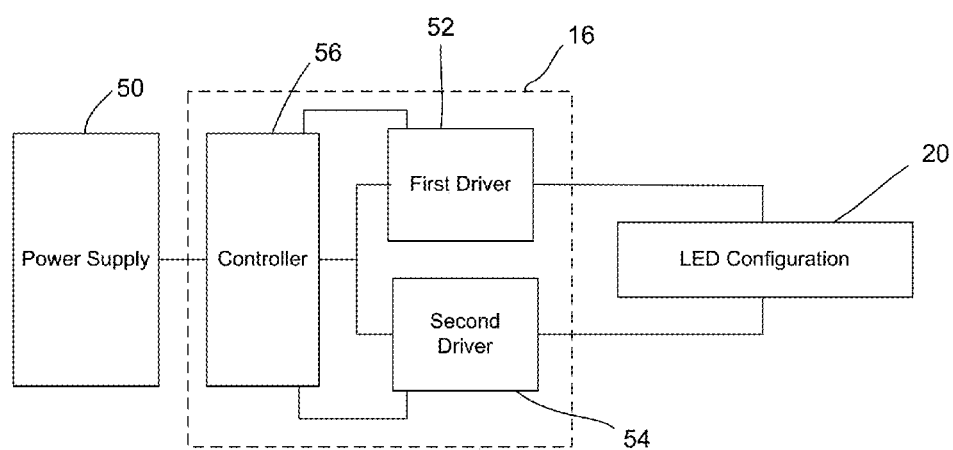
FIG. 33 is a diagrammatic illustration of the light fixture in accordance with one aspect of the disclosed technology.
Figure 34:
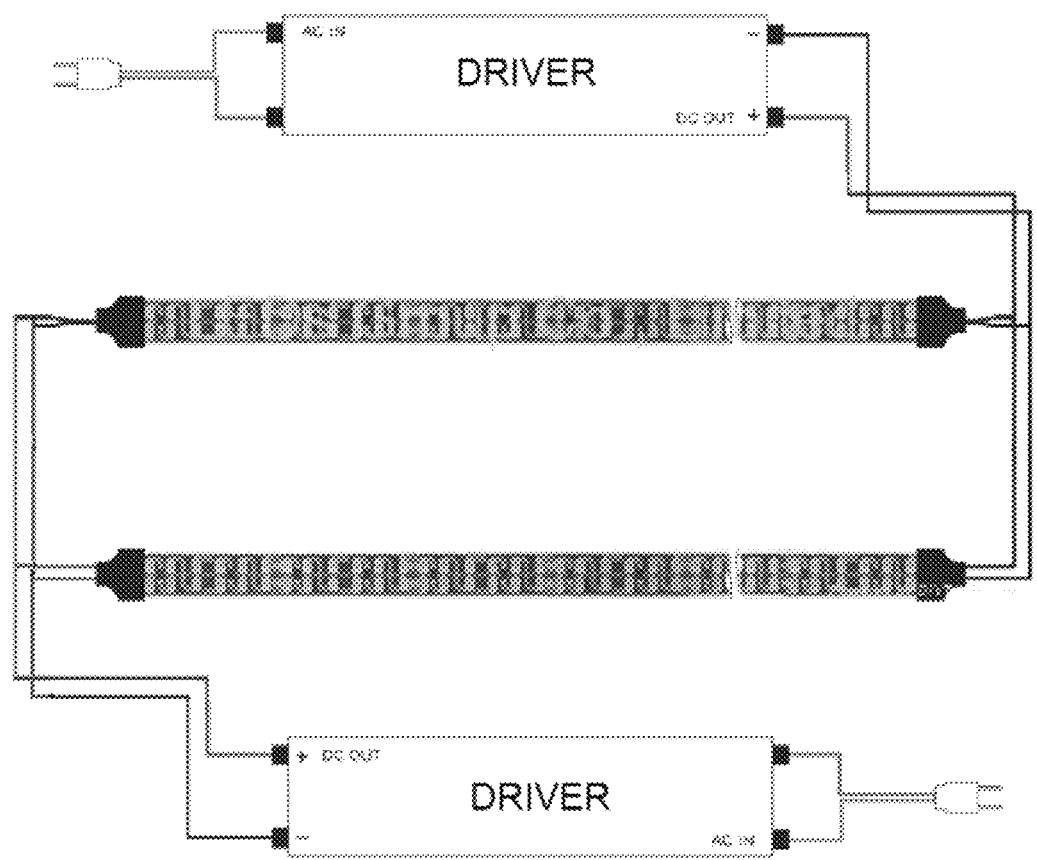
FIG. 34 is a diagrammatic illustration of the light fixture in accordance with one aspect of the disclosed technology.
Figure 35:
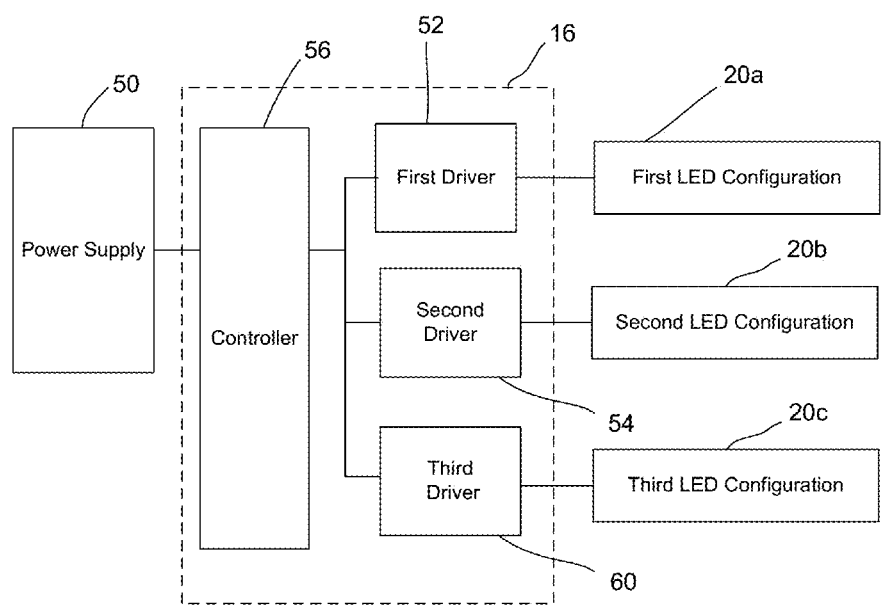
FIG. 35 is a diagrammatic illustration of the light fixture in accordance with one aspect of the disclosed technology.

In accordance with yet another aspect of the disclosed technology, the light fixture can be configured to include multiple drivers per LED configuration. For example, as shown in FIG. 33, in a simple case of a single LED configuration 20, a first driver 52 and a second driver 54 can be selectively operatively coupled to the LED configuration 20 together with appropriate switching or controlling circuitry 56. In this exemplary embodiment, a first driver 52 would be selected to electrically couple the LED configuration to the power supply 50. Fault detection circuitry (e.g., incorporated into the controller 56) can be employed to determine whether the first driver 52 is operating properly. If a fault condition occurs with the first driver 52, the controller or switching circuitry 56 can then switch over to the second driver 54 such that the second driver 54 electrically couples the LED configuration 20 to the associated power supply 50.

In accordance with another aspect of the disclosed technology, the light fixture can incorporate more than two configurations of LEDs, with a respective driver for each configuration of LEDs. For example in FIG. 35, the power circuitry 16 can include a first driver 52 operatively coupled to the first LED configuration 20a, a second driver 54 operatively coupled to the second LED configuration 20b, and a third driver 60 operatively coupled to the third LED configuration 20c. The power circuitry 16 can include a controller 56 operatively coupled to the first driver 52, the second driver 54 and the third driver 60, and configured to selectively operate the first driver 52, the second driver 54 and the third driver 56, thereby to control the first, second and third configurations of LEDs 20a, 20b, 20c in a desired manner. In a preferred embodiment, the first, second and third configurations of LEDs can be driven cyclically, for example, repeated over periods of time where the "on" cycle time for the first set of LEDs is identical or substantially identical to the "on" cycle time for the second set of LEDs and the "on" cycle time for the third set of LEDs. For example, while the first configuration of LEDs 20a is active, the second configuration of LEDs 20b and third configuration of LEDs can be set to inactive. Alternatively, two configurations of LEDs can be set to active during a given time period, while the third can be set to inactive. In the case of more than two configurations of LEDs, it will be appreciated that the configurations can be arranged in a manner consistent with the descriptions of two configurations above. For example, the first, second and third configurations of LEDs can be arranged in an alternating manner and/or in alternating strips or arrays.

In the case of the light fixture having multiple LED configurations, for example, a first LED configuration 20a and a second LED configuration 20b, the first driver can be selectively operatively coupled to both the first LED configuration and the second LED configuration. Similarly, the second driver can be selectively operatively coupled to the second LED configuration as well as the first LED configuration. The associated control and/or switching circuitry can be configured to monitor any fault conditions with one of the drivers and effectively switch the second driver over to control operation of the first and/or second LED configuration in the case of a malfunction in the first driver. For example, FIG. 28 shows an embodiment implementing this concept except that the embodiment of FIG. 28 shows a first LED configuration 20a and a second LED configuration 20b, where the first LED configuration and the second LED configuration are selectively operatively coupled to both the first driver 52 and the second driver 54. In this embodiment, the controller 56 provides similar functionality as that described above with respect to FIG. 33.

It will be appreciated that the provision of multiple driving circuitry along with appropriate control and fault detection circuitry can serve to prolong the rated life of the light fixture. This is due in part to the fact that in the case of LED-based light fixtures, the associated driving or control circuitry is more likely to fail than the LED arrays within the light fixture.

While aspects of the disclosed technology have been described in connection with a light fixture having a substantially flat LED panel, it will be appreciated that other LED-based configurations may be employed. For example, arrays of LEDs may be employed in connection with other focusing and/or brightness-enhancement optical elements besides those described above with respect to the various figures.

In addition, the LED panel can include a plurality of LEDs having outputs of various colors and/or color temperatures. For example, the substantially flat LED panel can include white LEDs having output of a predetermined color temperature. In accordance with another embodiment, the substantially flat LED panel can include multiple arrays of white LEDs having outputs of different color temperatures. These multiple arrays can be selectively energized to provide a "white light" of a variable color temperature. Alternatively, the multiple arrays can be selectively energized to maintain a desired overall lumen output to address or otherwise compensate for lumen degradation.

In accordance with another embodiment, the substantially flat LED panel can include a plurality of colored LEDs (e.g., LEDs having red output, green output and blue output), where the colored LEDs are configured to cooperate to produce white light when energized. In the case of a plurality of colored LEDs, the light fixture can include control circuitry that is configured to selectively energize the colored LEDs to provide light output of variable color temperature. The control circuitry also can be configured to control the intensity of the light emitted by the substantially flat LED panel, thereby providing a dimming function.

As described above, the preferred scheme for driving first and second configurations of LEDs is for these configurations to be activated alternatively. However, in special circumstances in which it is desirable to provide additional brightness, both configurations can be activated at the same time. For example, if an ambient light sensor of light fixture 10 detects brightness below a desired threshold value, light fixture 10 can activate two (or more, if available) configurations of LEDs at the same time. Alternatively, a stepping function can be applied to selectively energize multiple configurations of LEDs.

In accordance with one alternative embodiment, the LED panel can include one or more strips of LEDs disposed adjacent and least one edge of the frame, where each strip of LEDs is removably coupled to the power circuitry via a suitable electrical connector. It will be appreciated that this configuration allows for the easy replacement of one or more strips of LEDs within the substantially flat LED panel. For example, in the case of LED failure or burnout, the strip of LEDs could be easily replaced without replacing the entire fixture. In addition, the color output of the light fixture could be altered by swapping out one or more of the LED strips. For example, a holiday effect could be achieved by removing a strip of white LEDs and replacing the strip of white LEDs with colored LEDs.

To facilitate replacement of one or more LED strips within the flat LED panel, the frame can be provided with one or more sections that can be detached or otherwise separated from the remainder of the frame. For example, a cover section of the frame containing an LED strip may include a hinged connection to the remainder of the frame, and a pull tab. The user would pull open the cover section of the frame in order to uncover the LED strip for replacement.

In accordance with one embodiment, the light fixture includes at least one mounting member configured to mount (e.g., removably or permanently mount) the frame to a support surface. It will be appreciated that the mounting member may take on numerous forms depending on the desired application. For example, the mounting member can be configured to mount the frame to a substantially vertical support surface, such as a wall. In this case, the mounting member may include suitable clips, brackets or the like configured to anchor the light fixture to a wall in a home, a wall in a hotel, a wall in a parking garage or the like. In another exemplary embodiment, the mounting member can be configured to mount the frame to a substantially horizontal support surface, such as a ceiling, the underside of a cabinet or the like. Examples of other applications include, but are not limited to, stairwell lighting, emergency lighting (optionally including a battery backup), task lighting for cubicles, under counter lighting (e.g., kitchen work areas and within china cabinets), home or commercial garage lighting, lighting for retail shelving, aquarium lighting, and the like. As is described more fully below, the light fixture can be employed in a retrofit kit to retrofit an existing fluorescent lighting unit.

It will be appreciated that the light fixture can be arranged and/or installed together with a plurality of light fixtures where a primary light fixture is electrically coupled to an external power supply and other light fixtures can be coupled to the external power supply by way of the primary light fixture (so called "daisy chaining").

Examples of applications include, but are not limited to, stairwell lighting, emergency lighting (optionally including a battery backup), task lighting for cubicles, under counter lighting (e.g., kitchen work areas and within china cabinets), home or commercial garage lighting, lighting for retail shelving, aquarium lighting, and the like. The provision of a substantially flat LED panel fixture having edge lighting allows for thin panels of flexible length and width providing uniform light output.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A light fixture comprising:
    a frame having a thickness of no more than about 1.0 inches;
    a substantially flat light emitting diode (LED) panel disposed within the frame, the substantially flat LED panel including an array of LEDs disposed adjacent at least one edge of the frame; and
    power and control circuitry for driving the array of LEDs housed entirely within the frame at an edge of the frame, the power and control circuitry including an LED driver configured to convert an AC input from an external AC power supply into a DC output; wherein the power and control circuitry has a length and a width, wherein the length-to-width ratio is at least 5 to 1.

2. The light fixture of claim 1, wherein the power and control circuitry is sized to be positioned entirely within a channel defined by the frame.

3. The light fixture of claim 2, wherein the frame defines a second channel configured to support the power and control circuitry.

4. The light fixture of claim 3, wherein the second channel has a width of no more than about 0.5 inches.

5. The light fixture of claim 1, wherein the power and control circuitry includes a single circuit board.

6. The light fixture of claim 1, wherein the power and control circuitry comprises an array of circuit modules.

7. The light fixture of claim 1, wherein the power and control circuitry includes control circuitry configured to control intensity of light emitted by the substantially flat LED panel, providing a dimming function.

8. The light fixture of claim 1, wherein the power and control circuitry includes control circuitry configured to selectively energize the array of LEDs to provide a light output of variable color temperature.

9. The light fixture of claim 1, wherein the substantially flat light emitting diode (LED) panel includes an optically transmissive panel, and the array of LEDs is disposed adjacent to an edge of the optically transmissive panel.

10. The light fixture of claim 1, wherein at least a portion of the frame is configured to support electrical connectors between the power and control circuitry and the array of LEDs.

11. The light fixture of claim 1, wherein the length-to-width ratio of the power and control circuitry is at least 10 to 1.

12. A light fixture comprising:
    a frame configured to define a first channel, wherein the frame has a thickness of no more than about 1.0 inches;
    a substantially flat light emitting diode (LED) panel disposed within the frame and including an array of LEDs supported by a wall of a second channel located at an edge of the frame, wherein the wall of the second channel is offset from the edge of the frame; and
    power and control circuitry for driving the array of LEDs disposed within the first channel, the power and control circuitry including an LED driver configured to convert an AC input from an external AC power supply into a DC output;
    wherein the power and control circuitry comprises long, narrow circuitry having a length-to-width ratio of at least 5 to 1 and sized to be positioned within the first channel, and includes a circuit board.

13. The light fixture of claim 12, wherein the circuit board comprises a single circuit board.

14. The light fixture of claim 12, wherein the circuit board comprises an array of circuit modules distributed within the first channel.

15. The light fixture of claim 12, wherein the power and control circuitry includes control circuitry configured to control intensity of light emitted by the substantially flat LED panel, providing a dimming function.

16. The light fixture of claim 12, wherein the power and control circuitry includes control circuitry configured to selectively energize the array of LEDs to provide a light output of variable color temperature.

17. The light fixture of claim 12, wherein the length-to-width ratio of the power and control circuitry is at least 10 to 1.

18. A light fixture comprising:
    a frame configured to define a first channel and a second channel on opposite first and second sides of the frame, and a third channel and a fourth channel on remaining third and fourth sides of the frame, wherein the frame is rectangular;
    a substantially flat light emitting diode (LED) panel disposed within the frame, including a first array of LEDs disposed adjacent the first side of the frame and a second array of LEDs disposed adjacent the second side of the frame, wherein the first channel is configured to support the first array of LEDs and the second channel is configured to support the second array of LEDs; and
    first and second power and control circuitry respectively disposed within the third channel and the fourth channel, wherein the first and second power and control circuitry respectively drive the first array of LEDs and the second array of LEDs; wherein each of the first and second power and control circuitry includes an LED driver configured to convert an AC input from an external AC power supply into a DC output; and wherein each of the first and second power and control circuitry has a length and a width, wherein the length-to-width ratio is at least 5 to 1.

19. The light fixture of claim 18, wherein each of the first and second power and control circuitry includes control circuitry configured to control intensity of light emitted by the substantially flat LED panel, providing a dimming function.

20. The light fixture of claim 18, wherein each of the first and second power and control circuitry includes control circuitry configured to selectively energize the array of LEDs to provide a light output of variable color temperature.

* * * * *